US010655083B2

(12) United States Patent
Cantrell et al.

(10) Patent No.: US 10,655,083 B2
(45) Date of Patent: *May 19, 2020

(54) METHOD OF PROCESSING ETHANOL BYPRODUCTS AND RELATED SUBSYSTEMS

(71) Applicant: GS CLEANTECH CORPORATION, Alpharetta, GA (US)

(72) Inventors: David F. Cantrell, Lakemont, GA (US); David J. Winsness, Alpharetta, GA (US)

(73) Assignee: GS CLEANTECH CORPORATION, Alpharetta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/661,369

(22) Filed: Mar. 18, 2015

(65) Prior Publication Data
US 2015/0191675 A1    Jul. 9, 2015

Related U.S. Application Data

(63) Continuation of application No. 13/450,997, filed on Apr. 19, 2012, now Pat. No. 9,212,334, which is a
(Continued)

(51) Int. Cl.
*C11B 7/00* (2006.01)
*C11B 3/00* (2006.01)
(Continued)

(52) U.S. Cl.
CPC ............ *C11B 3/001* (2013.01); *B01D 3/004* (2013.01); *C11B 1/00* (2013.01); *C11B 13/00* (2013.01); *C12F 3/10* (2013.01); *Y02W 30/74* (2015.05)

(58) Field of Classification Search
CPC ........... C11B 3/001; C11B 1/00; C11B 13/00; B01D 3/004; C12F 3/00; Y02W 30/746
See application file for complete search history.

(56) References Cited

U.S. PATENT DOCUMENTS 313,665 A   11/1884   Greene
365,120 A    6/1887   Delaval
(Continued)

FOREIGN PATENT DOCUMENTS

DE    80874 K1       5/1971
DE    19547866 C1   12/1995
(Continued)

OTHER PUBLICATIONS

Singh, et al., "Extraction of Oil from Corn Distillers Dried Grains with Solubles", 1998, Transactions of the ASAE, Bol. 41(6), pp. 1175 and 1176.*
(Continued)

*Primary Examiner* — Deborah D Carr
(74) *Attorney, Agent, or Firm* — Porzio Bromberg & Newman P.C.

(57) ABSTRACT

In one aspect of the invention, a method recovers oil from a concentrated byproduct, such as evaporated thin stillage formed during a dry milling process used for producing ethanol. The method includes forming a concentrate from the byproduct and recovering oil from the concentrate. The step of forming the concentrate may comprise evaporating the byproduct. Further, the step of separating the oil from the concentrate may comprise using a centrifuge and, in particular, a disk stack centrifuge. Other aspects of the invention include related methods and subsystems for recovering oil from thin stillage.

7 Claims, 4 Drawing Sheets

Related U.S. Application Data continuation of application No. 13/107,197, filed on May 13, 2011, now Pat. No. 8,283,484, which is a continuation of application No. 11/241,231, filed on Sep. 30, 2005, now Pat. No. 8,008,516, and a continuation of application No. 12/559,136, filed on Sep. 14, 2009, now Pat. No. 8,008,517, which is a continuation of application No. 11/122,859, filed on May 5, 2005, now Pat. No. 7,601,858.

(60) Provisional application No. 60/602,050, filed on Aug. 17, 2004.

(51) Int. Cl.
*B01D 3/00* (2006.01)
*C11B 1/00* (2006.01)
*C11B 13/00* (2006.01)
*C12F 3/10* (2006.01)

(56) References Cited

U.S. PATENT DOCUMENTS

| | | |
|---|---|---|
| 445,066 A | 1/1891 | Delaval |
| 1,310,977 A | 7/1919 | Barton |
| 1,366,339 A | 1/1921 | Alexander |
| 2,206,024 A | 8/1937 | Brown |
| 2,216,904 A | 10/1940 | Brown |
| 2,216,905 A | 10/1940 | Brown et al. |
| 2,263,608 A | 11/1941 | Brown |
| 2,325,327 A | 7/1943 | Lachle |
| 2,439,177 A | 4/1948 | Manning |
| 2,446,913 A | 8/1948 | Erlich |
| 2,615,029 A | 2/1950 | Rosten |
| 2,524,718 A | 10/1950 | Stark |
| 2,663,718 A | 12/1953 | Strezynski |
| 2,929,150 A | 3/1960 | Johnston |
| 3,061,622 A | 10/1962 | Fiala |
| 3,451,990 A | 6/1969 | Sole, Jr. |
| 3,460,751 A | 8/1969 | Hemfort, Sr. |
| 3,721,568 A | 3/1973 | Wilson et al. |
| 3,931,258 A | 1/1976 | Lake |
| 3,950,230 A | 4/1976 | Greenfield et al. |
| 4,061,568 A | 12/1977 | Hall |
| 4,105,553 A | 8/1978 | Oldham |
| 4,137,335 A | 1/1979 | Holm et al. |
| 4,163,009 A | 7/1979 | Filstrup |
| 4,216,239 A | 8/1980 | Gloppestad |
| 4,270,974 A | 6/1981 | Greenfield et al. |
| 4,341,713 A | 7/1982 | Stolp et al. |
| 4,381,220 A | 4/1983 | Standiford |
| 4,407,955 A | 10/1983 | Muller et al. |
| 4,425,239 A | 1/1984 | Jacocks et al. |
| 4,532,144 A | 7/1985 | Vernet |
| 4,593,614 A | 6/1986 | Berge et al. |
| 4,619,789 A | 10/1986 | Strop et al. |
| 4,662,990 A | 5/1987 | Bonanno |
| 4,812,225 A | 3/1989 | Corti et al. |
| 4,944,954 A | 7/1990 | Strop et al. |
| 4,952,504 A | 8/1990 | Pavilon |
| 5,113,755 A | 5/1992 | Anderson et al. |
| 5,250,182 A | 10/1993 | Bento et al. |
| 5,256,251 A | 10/1993 | Holcombe |
| 5,269,947 A | 12/1993 | Baskis |
| 5,278,325 A | 1/1994 | Strop et al. |
| 5,316,782 A | 5/1994 | Zimlich, III |
| 5,439,701 A | 8/1995 | Zimlich, III |
| 5,470,458 A | 11/1995 | Ripley et al. |
| 5,662,810 A | 9/1997 | Willgohs |
| 5,801,140 A | 9/1998 | Langley et al. |
| 5,958,233 A | 9/1999 | Willgohs |
| 5,980,754 A | 11/1999 | Hopkins et al. |
| 5,998,641 A | 12/1999 | Ganguli et al. |
| 6,106,673 A | 8/2000 | Walker |
| 6,106,678 A | 8/2000 | Shufflebotham et al. |
| 6,143,532 A | 11/2000 | Wenzel et al. |
| 6,146,645 A | 11/2000 | Deckers et al. |
| 6,214,236 B1 | 4/2001 | Scalliet |
| 6,433,146 B1 | 8/2002 | Cheryan |
| 6,726,941 B2 | 4/2004 | Ethington, Jr. et al. |
| 6,761,914 B2 | 7/2004 | Deckers et al. |
| 7,297,236 B1 | 11/2007 | Vander Griend |
| 7,431,952 B2 | 10/2008 | Bijl et al. |
| 7,572,627 B2 | 8/2009 | Rieke et al. |
| 7,601,858 B2 | 10/2009 | Cantrell et al. |
| 8,008,516 B2 | 8/2011 | Cantrell et al. |
| 8,008,517 B2 | 8/2011 | Cantrell et al. |
| 8,168,037 B2 | 5/2012 | Winsness |
| 8,283,484 B2 | 10/2012 | Cantrell et al. |
| 2003/0093832 A1 | 5/2003 | Szarka et al. |
| 2003/0180415 A1 | 9/2003 | Stiefel et al. |
| 2004/0081654 A1 | 4/2004 | Schrybers et al. |
| 2004/0082044 A1 | 4/2004 | Prevost et al. |
| 2004/0087808 A1* | 5/2004 | Prevost et al. ................. 554/9 |
| 2010/0028484 A1 | 2/2010 | Kriesler et al. |
| 2011/0282085 A1 | 11/2011 | Cantrell et al. |
| 2012/0205324 A1 | 8/2012 | Cantrell et al. |

FOREIGN PATENT DOCUMENTS

| | | |
|---|---|---|
| FR | 1568774 C1 | 10/1967 |
| GB | 1070128 C1 | 5/1967 |
| GB | 2007205 A | 8/1978 |
| JP | 5464683 A | 5/1979 |

OTHER PUBLICATIONS

Yokoyama, et al. "Liquid Fuel Production from Ethanol Fermentation Stillage" 1986, The Chemical Society of Japan, pp. 649-652.*
Corrected Memorandum Opinion & Order After Bench Trial; Document 1653 Filed Sep. 2016.*
Rule 7.1 Disclosure Statement of Defendant Little Sioux Corn Processors, LLLP, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 22, 2014; 2 pages, Document No. 1115.
Rule 7.1 Disclosure Statement of Defendant Guardian Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 22, 2014; 2 pages, Document No. 1118.
Tag-Along Defendants Aemetis, Inc., Aemetis Advanced Fuels Keyes, Inc., Homeland Energy Solutions, LLC and Pacific Ethanol, Inc.'s Response to the Court's Order to Submit Written Objections to the Court's Case Management Deadlines, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 23, 2014; 5 pages, Document No. 1119.
Tag-Along Defendants Aemetis, Inc., Aemetis Advanced Fuels Keyes, Inc., Homeland Energy Solutions, LLC and Pacific Ethanol, Inc.'s Response to Order to Show Cause, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 23, 2014; 6 pages, Document No. 1121.
GS Cleantech's Response to Minute Entry and Order (MDN 1084), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 23, 2014; 4 pages, Document No. 1123.
GS Cleantech Corporation's Surreply in Support of Plaintiff's Motions for Summary Judgment of Infringement by Plant Defendants, filed in the United States District Court, Southern District of

(56) References Cited

OTHER PUBLICATIONS

Indiana, Indianapolis, Division, in re: Method of Processing Ethanol Byproducts and Related Subsystems ('858) Patent Litigation; Master Case. No. 1:10-ml-02181-LJM-DML; dated Feb. 18, 2014; 14 pages, Document No. 1137.
GS Cleantech Corporation's Surreply in Response to Defendants' Joint Reply in Support of Their Motion for Summary Judgment of Invalidity, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 18, 2014; 7 pages, Document No. 1138.
Plaintiff GS Cleantech Corporation's Reply in Support of its Cross Motion for Summary Judgment of no Invalidity Under 35 U.S.C. § 112, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML: dated Feb. 18, 2014; 8 pages, Document No. 1139.
Joint Proposed Agenda, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 20, 2014; 5 pages, Document No. 1140.
Supplemental Agenda Item, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 24, 2014; 4 pages, Document No. 1141.
Plaintiff GS Cleantech Corporation's Cross Motion for Summary Judgment of no Invalidity Under 35 U.S.C. § 102(e) Against Big River Resources Galva, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 18, 2014; 2 pages, Document No. 1142.
Plaintiff GS Cleantech Corporation's Cross Motion for Summary Judgment of no Invalidity Under 35 U.S. C. § 112 Against Big River Resources Galva, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1143.
Plaintiff GS Cleantech Corporation's Cross Motion for Summary Judgment of no Invalidity Under 35 U.S. C § 112 Against Big River Resources West Burlington, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1144.
Plaintiff GS Cleantech Corporation's Cross Motion for Summary Judgment of no Invalidity Under 35 U.S. C. § 112(e) Against Big River Resources West Burlington, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1145.
Plaintiff GS Cleantech Corporation's Cross Motion for Summary Judgment of no Invalidity Under 35 U.S. C. § 112(e) Against Blue Flint Ethanol, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1146.
Plaintiff GS Cleantech Corporation's Cross Motion for Summary Judgment of no Invalidity Under 35 U.S. C. § 112 Against Blue Flint Ethanol, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1147.
Plaintiff GS Cleantech Corporation's Cross Motion for Summary Judgment of no Invalidity Under 35 U.S. C. § 112 Against Cardinal Ethanol, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1148.
Plaintiff GS Cleantech Corporation's Cross Motion for Summary Judgment of no Invalidity Under 35 U.S. C. § 102(e) Against Cardinal Ethanol, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1149.
Plaintiff GS Cleantech Corporation's Cross Motion for Summary Judgment of no Invalidity Under 35 U.S. C. § 102(e) Against Lincolnland Agri-Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1150.
Plaintiff GS Cleantech Corporation's Cross Motion for Summary Judgment of no Invalidity Under 35 U.S. C. § 112 Against Lincolnland Agri-Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1151.
Plaintiff GS Cleantech Corporation's Cross Motion for Summary Judgment of no Invalidity Under 35 U.S. C. § 112 Against Lincolnway Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1152.
Plaintiff GS Cleantech Corporation's Cross Motion for Summary Judgment of no Invalidity Under 35 U.S. C. § 102(e) Against Lincolnway Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1153.
Plaintiff GS Cleantech Corporation's Cross Motion for Summary Judgment of no Invalidity Under 35 U.S. C. § 102(e) Against Flottweg Separation Technology, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1154.
Plaintiff GS Cleantech Corporation's Cross Motion for Summary Judgment of no Invalidity Under 35 U.S. C. § 112 Against Flottweg Separation Technology, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1155.
Plaintiff GS Cleantech Corporation's Cross Motion for Summary Judgment of no Invalidity Under 35 U.S. C. § 112 Against David Vandergriend, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1156.
Plaintiff GS Cleantech Corporation's Cross Motion for Summary Judgment of no Invalidity Under 35 U.S. C. § 102(e) Against David Vandergriend, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1157.

(56) References Cited

OTHER PUBLICATIONS

Plaintiff GS Cleantech Corporation's Cross Motion for Summary Judgment of no Invalidity Under 35 U.S. C. § 102(e) Against ICM, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1158.

Plaintiff GS Cleantech Corporation's Cross Motion for Summary Judgment of no Invalidity Under 35 U.S. C. § 112 Against ICM, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 2 pages, Document No. 1159.

Stipulation Regarding Claim Construction Arguments and the Tag-Along Defendants, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Mar. 14, 2014; 3 pages, Document No. 1162.

Plaintiff GS Cleantech Corporation's Motion to Amend the Scheduling Order for Tag-Along Cases to Extend the Deadline for Motions to Amend Pleadings, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Mar. 18, 2014; 4 pages, Document No. 1164.

[Corrected] Memorandum of Law in Support of Defendants' Joint Motion for Summary Judgment of Invalidity and to Dismiss Plaintiff's Request for Provisional Remedies and Enhanced Damages for Willful Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Mar. 27, 2014; 139 pages, Document No. 1174.

Tag-Along Defendants' Resistance to GS Cleantech Corporation's Motion to Amend the Scheduling Order for Tag-Along Cases to Extend the Deadline for Motions to Amend Pleadings, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Apr. 1, 2014; 5 pages, Document No. 1176.

Plaintiff GS Cleantech Corporation's Reply to Tag-Along's Resistance to Cleantech's Motion to Amend the Scheduling Order for Tag-Along Cases to Extend the Deadline for Motions to Amend Pleadings, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Apr. 11, 2014; 5 pages, Document No. 1178.

Joint Reply in Support of Defendants' Motion for Summary Judgment of Invalidity and NonInfringement of U.S. Pat. No. 8,168,037 and Surreply in Response to Plaintiff's Motion for Summary Judgment of Infringement of U.S. Pat. No. 8,168,037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Apr. 14, 2014; 18 pages, Document No. 1179.

Defendants' Joint Motion for Oral Argument on Motions for Summary Judgment of Non-Infringement and invalidity of U.S. Pat. No. 8,168,037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Apr. 14, 2014; 3 pages, Document No. 1180.

GS Cleantech Corporation's Motion to Submit a Surreply in Response to Defendants' Joint Reply in Support of Defendants' Motion for Summary Judgment of Invalidity and NonInfringement of U.S. Pat. No. 8,168,037 and Surreply in Response to Plaintiff's Motion for Summary Judgment of Infringement of U.S. Pat. No. 8,168,037, filed in the U.S.D.C., Southern District of Indiana, Indianapolis, Division, Master Case. No. 1:10-ml-02181-LJM-DML; dated Apr. 24, 2014; 3 pages, Document No. 1182.

GS Cleantech Corporation's Surreply in Response to Defendants' Joint Reply in Support of Defendants' Motion for Summary Judgment of Invalidity and NonInfringement of U.S. Pat. No. 8,168,037 and Surreply in Response to Plaintiff's Motion for Summary Judgment of Infringement of U.S. Pat. No. 8,168,037, filed in the U.S.D.C., Southern District of Indiana, Indianapolis, Division; Master Case. No. 1:10-ml-02181-LJM-DML; dated Apr. 24, 2014; 8 pages, Document No. 1184.

Defendants' Joint Motion to Submit a Joint Sur-Surreply Brief in Response to GS Cleantech Corporation's Surreply in Response to Defendants' Joint Reply in Support of Defendants' Motion for Summary Judgment of Invalidity and NonInfringement of U.S. Pat. No. 8,168,037 and Surreply in Response to Plaintiff's Motion for Summary Judgment of Infringement of U.S. Pat. No. 8,168,037, filed in the U.S.D.C., Southern District of Indiana, Indianapolis, Division; Master Case. No. 1:10-ml-02181-LJM-DML; dated Apr. 30, 2014; 3 pages, Document No. 1190.

GS Cleantech Corporation's Surreply in Response to Defendants' Joint Reply in Support of Defendants' Motion for Summary Judgment of Invalidity and NonInfringement of U.S. Pat. No. 8,168,037 and Surreply in Response to Plaintiff's Motion for Summary Judgment of Infringement of U.S. Pat. No. 8,168,037, filed in the U.S.D.C.; Master Case. No. 1:10-ml-02181-LJM-DML; dated Apr. 24, 2014; 8 pages, Document No. 1191.

Plaintiff GS Cleantech Corporation's Motion to Amend the Scheduling order for Tag-Along Cases to Extend the Deadlines (With Partial Assent), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated May 13, 2014; 5 pages, Document No. 1194.

Answer of Pacific Ethanol Magic Valley, LLC to Plaintiff GS Cleantech Corporation Complaint for Patent Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated May 28, 2014; 16 pages, Document No. 1195.

Answer of ICM, Inc. to Plaintiff GS Cleantech Corporation Complaint for Patent Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated May 28, 2014; 16 pages, Document No. 1196.

Opposition to Plaintiff's Motion to Amend the Scheduling Order for Tag-Along Cases to Extend the Deadlines, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated May 28, 2014; 5 pages, Document No. 1197.

Rule 7.1 Disclosure Statement of Defendant Pacific Ethanol Magic Valley, LLC., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated May 30, 2014; 2 pages, Document No. 1198.

Rule 7.1 Disclosure Statement of Defendant ICM, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated May 30, 2014; 2 pages, Document No. 1199.

Defendant David Vander Griend's Motion to Dismiss for Lack of Personal Jurisdiction, filed in the United States District Court, Southern District of Indiana, Indianapolis, Division, in re: Method of Processing Ethanol Byproducts and Related Subsystems ('858)

(56) References Cited

OTHER PUBLICATIONS

Patent Litigation; Master Case. No. 1:10-ml-02181-LJM-DML; dated Jun. 2, 2014; 2 pages, Document No. 1201.
Pacific Ethanol Stockton, LLC, Answer and Counterclaims., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 4, 2014; 21 pages, Document No. 1205.
Memorandum of Law in Support of Defendant David Vander Griend's Motion to Dismiss for Lack of Personal Jurisdiction, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 2, 2014; 9 pages, Document No. 1202.
Rule 7.1 Disclosure Statement of Defendant Pacific Ethanol Stockton, LLC., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 4, 2014; 5 pages, Document No. 1206.
Tag-Along Defendants' Notice of Service of Experts' Reports, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 10, 2014; 6 pages, Document No. 1212.
Stipulation Regarding Claim Construction Arguments and the Tag-Along Defendants, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 13, 2014; 3 pages, Document No. 1213.
GS Cleantech Corporation's Answer to Homeland Energy Solutions, LLC's Counterclaims, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 13, 2014; 6 pages, Document No. 1214.
Defendants' Supplemental Brief in Support of Summary Judgment of Invalidity for Indefiniteness Pursuant to the Court's Order Requiring Briefing of Impact of *Nautilus, Inc.* V. *Biosig Instruments, Inc.*, 572 U.S. (Jun. 2, 2014), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 13, 2014; 8 pages, Document No. 1215.
GS Cleantech Corporation's Opposition to Defendant David Vander Griend's Motion to Dismiss for Lack of Personal Jurisdiction, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 19, 2014; 9 pages, Document No. 1224.
Motion to Withdraw as Counsel for Defendants GEA Mechanical Equipment US, Inc. and Ethanol, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 19, 2014; 2 pages, Document No. 1225.
Plaintiff's Response to Defendants' Supplemental Brief in Support of Summary Judgment of Invalidity for Indefiniteness Under 35 U.S.C. § 112, ¶2, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML: dated Jun. 20, 2014; 6 pages, Document No. 1226.

Plaintiff's Motion to Amend the Complaint Against Guardian Energy, LLC., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 20, 2014; 3 pages, Document No. 1228.
Plaintiff's Memorandum of Law in Support of its Motion to Amend the Complaint Against Guardian Energy, LLC., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 20, 2014; 8 pages, Document No. 1229.
Assented-To-Motion for Leave to Amend Complaint Against Aemetis, Inc. and Aemetis Advanced Fuels Keyes, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 20, 2014; 4 pages, Document No. 1233.
GS Cleantech Corporation's Answer to Pacific Ethanol Stockton, LLC's Counterclaims, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 25, 2014; 7 pages, Document No. 1236.
First Amended Complaint for Patent Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 25, 2014; 11 pages, Document No. 1237.
Defendants' Supplemental Reply Brief in Support of Summary Judgment of Invalidity for Indefiniteness Under 35 U.S.C § 112 ¶ 2 Pursuant to the Court's Order Requiring Briefing of Impact of *Nautilus, Inc.* V. *Biosig Instruments, Inc.*, 572 U.S. (Jun. 2, 2014), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 27, 2014; 10 pages, Document No. 1238.
Reply Memorandum of Law in Support of Defendant David Vander Griend's Motion to Dismiss for Lack of personal Jurisdiction, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 30, 2014; 9 pages, Document No. 1240.
Joint Motion to Amend the Scheduling Orders for Tag-Along Cases., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jul. 7, 2014; 6 pages, Document No. 1243.
Aemetis, Inc., and Aemetis Advanced Fuels Keyes, Inc., Answer to First Amended Complaint for Patent Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jul. 15, 2014; 14 pages, Document No. 1248.
Aemetis, Inc., and Aemetis Advanced Fuels Keyes, Inc., Answer to First Amended Complaint for Patent Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jul. 16, 2014; 14 pages, Document No. 1249.
Plaintiff's Reply in Support of its Motion to Amend the Complaint Against Guardian Energy, LLC, filed in the United States District Court, Southern District of Indiana, Indianapolis, Division, in re: Method of Processing Ethanol Byproducts and Related Subsystems

(56) References Cited

OTHER PUBLICATIONS ('858) Patent Litigation; Master Case. No. 1:10-ml-02181-LJM-DML; dated Jul. 17, 2014; 14 pages, Document No. 1251.

Plaintiff's Motion to Amend its Complaint Against Southwest Iowa Renewable Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jul. 29, 2014; 3 pages, Document No. 1258.

Plaintiff's Memorandum of Law in Support of its Motion to Amend its Complaint Against Southwest Iowa Renewable Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jul. 29, 2014; 8 pages, Document No. 1259.

Plaintiff's Motion to Amend its Complaint Against Little Sioux Corn Processors, LLP, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jul. 29, 2014; 3 pages, Document No. 1262.

Plaintiff's Memorandum of Law in Support of its Motion to Amend its Complaint Against Little Sioux Corn Processors, LLP, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jul. 29, 2014; 7 pages, Document No. 1263.

Plaintiff's Notice of Correction to its Motions to Amend the Complaints Against Southwest Iowa Renewable Energy, LLC; Little Sioux Corn Processors, LLP; and Western New York Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 1, 2014; 3 pages, Document No. 1269.

Plaintiff's Memorandum of Law in Support of its Motion to Amend its Complaint Against Western New York Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 4, 2014; 8 pages, Document No. 1270.

Joint Opposition to Plaintiff's Motions to Amend the Complaint Against Southwest Iowa Renewable Energy, Western New York Energy, and Little Sioux Corn Processors, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 15, 2014; 7 pages, Document No. 1274.

Plaintiff's Reply in Support of its Motion to Amend the Complaints Against Little Sioux Corn Processors, LLP; Southwest Iowa Renewable Energy, LLC; and Western New York Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 25, 2014; 9 pages, Document No. 1276.

GEA Mechanical Equipment US Inc's Reply Brief in Further Support of its Motion for Summary Judgment on the Issue of Liability for Inducing or Contributing to Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 17, 2014; 16 pages, Document No. 1087.

GS Cleantech Corporation's Reply Brief in Support of its Motions for Summary Judgment of Infringement by '037 Plant Defendants and Memorandum in Support of its Cross Motions for Summary Judgment of no Invalidity for Lack of Enablement Under 35 U.S. C. 112 or 102(e), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Feb. 28, 2014; 27 pages, Document No. 1160.

Aemetis Inc.'s Final Invalidity Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 22, 2014; 42 pages, including Certificate of Service.

Aemetis Advanced Fuels Keyes, Inc.'s Final Invalidity Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 22, 2014; 42 pages, including Certificate of Service.

Homeland Energy Solutions, LLC's Final Invalidity Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 22, 2014; 42 pages, including Certificate of Service.

Pacific Ethanol Stockton LLC's Final Invalidity Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; Aug. 22, 2014; 42 pages, including Certificate of Service.

Pacific Ethanol, Inc.'s Final Invalidity Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; Aug. 22, 2014; 42 pages, including Certificate of Service.

GS Cleantech Corporation's Disclosure of Asserted Claims and Final Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 22, 2014; 21 pages, including Certificate of Service.

GS Cleantech Corporation's Disclosure of Asserted Claims and Final Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 22, 2014; 22 pages, including Certificate of Service.

GS Cleantech Corporation's Disclosure of Asserted Claims and Final Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 22, 2014; 16 pages, including Certificate of Service.

GS Cleantech Corporation's Disclosure of Asserted Claims and Final Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 22, 2014; 12 pages, including Certificate of Service.

GS Cleantech Corporation's Disclosure of Asserted Claims and Final Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 22, 2014; 20 pages, including Certificate of Service.

(56) References Cited

OTHER PUBLICATIONS

Invalidity Contentions of Defendants for the Asserted Claims of the '858, '516, '517, and '484 Patents, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Mar. 7, 2014; 2 pages, including Certificate of Service.
Aemetis Advanced Fuels Keyes Inc.'s Preliminary Invalidity Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Mar. 7, 2014; 22 pages, including Certificate of Service.
Aemetis Advanced Fuels Keyes, Inc. Claim Chart Obviousness/Anticipation 35 USC 103/102 '858, '516, '517, '484, '037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML: 18 pages.
Aemetis, Inc.'s Preliminary Invalidity Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; Mar. 7, 2014; 22 pages, including Certificate of Service.
Aemetis, Inc. Claim Chart Obviousness/Anticipation 35 USC 103/102 '858, '516, '517, '484, '037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Aug. 22, 2014; 18 pages.
GS Cleantech Corporation's Disclosure of Asserted Claims and Preliminary Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 28, 2014; 14 pages, including Certificate of Service.
GS Cleantech Corporation's Disclosure of Asserted Claims and Preliminary Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 28, 2014; 7 pages, including Certificate of Service.
GS Cleantech Corporation's Disclosure of Asserted Claims and Preliminary Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 28, 2014; 12 pages, including Certificate of Service.
GS Cleantech Corporation's Disclosure of Asserted Claims and Preliminary Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 28, 2014; 11 pages, including Certificate of Service.
GS Cleantech Corporation's Disclosure of Asserted Claims and Preliminary Infringement Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 28, 2014; 10 pages, including Certificate of Service.
[Corrected] Memorandum of Law in Support of Defendants' Joint Motion for Summary Judgment of Invalidity and to Dismiss Plaintiff's Request for provisional Remedies and Enhanced Damages for Willful Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 4, 2013; 138 pages, Document No. 970-1.
Declaration of Michael Rye in Support of GS Cleantech Corporation's Consolidated Reply in Support of its Motion for Summary Judgment of Infringement and Opposition to Individual Defendants' Motions for Summary Judgment, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 3, 2013; 7 pages, Document No. 1036.
Declaration of Michael Rye in Support of Plaintiffs' Memorandum in Opposition to Defendants' Joint Motion for Summary Judgment of Invalidity and to Dismiss Plaintiffs' Request for Provisional Remedies and Enhanced Damages for Willful Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 3, 2013; 7 pages, Document No. 1039.
Declaration of Michael Rye in Opposition to ICM's Request for Reimbursement of Costs and Attorneys Fees, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 25, 2013; 5 pages, Document No. 1033.
Declaration of Chad A. Denver in Support of GS Cleantech Corporation's Memorandum of Law in Support of its Motions for Summary Judgment of Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 23, 2013; 6 pages, Document No. 990.
Defendants' Unopposed Motion for Leave to File a Corrected Memorandum of Law in Support of Defendants' Joint Motion for Summary Judgment of Invalidity, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 4, 2013; 3 pages, Document No. 970.
Plaintiff's GS Cleantech Corporation Cross Motion for Summary Judgment of no Invalidity Under 35 U.S.C. § 112 Against Hearland Corn Products, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; date Nov. 22, 2013; 3 pages, Document No. 1008.
GS Cleantech Corporation's Memorandum of Law in Support of its Motions for Summary Judgment of Infringement by the '037 Plant Defendants, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML: dated Oct. 23, 2013; 42 pages, Document No. 989.
Plaintiff's Brief in Opposition to Defendants Ametis, Inc. and Aemetis Advanced Fuels Keyes, Inc.'s Motion for Suggestion for Remand, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML: dated Oct. 7, 2013; 8 pages, Document No. 971.
Memorandum of Law in Support of Defendants' Joint Motion for Summary Judgment of Invalidity and to Dismiss Plaintiff's Request for Provisional Remedies and Enhanced Damages for Willful Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 24, 2013; 139 pages, Document No. 948.

(56) References Cited

OTHER PUBLICATIONS

Plaintiff's GS Cleantech Corporation Cross Motion for Summary Judgment of no Invalidity Under 35 U.S.C. § 112 Against GEA Mechanical Equipment US, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1021.

Plaintiff's GS Cleantech Corporation Cross Motion for Summary Judgment of no Invalidity Under 35 U.S.C. § 112 Against ICM, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1022.

Plaintiff's GS Cleantech Corporation Cross Motion for Summary Judgment of no Invalidity Under 35 U.S.C . § 112 Against David J. Vander Griend, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1024.

Plaintiff's GS Cleantech Corporation Cross Motion for Summary Judgment of no Invalidity Under 35 U.S.C. § 112 Against Iroquois Bio-Energy Company, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1020.

GS Cleantech Corporation's Memorandum of Law in Opposition to Defendants' Motion to Compel Testimony of Peter Hagerty, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 25, 2013; 12 pages, Document No. 993.

GS Cleantech Corporation's Motion for Summary Judgment of Infringement of U.S. Pat. No. 8,168.037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 23, 2013; 3 pages, Document No. 985.

Plaintiff's Memorandum in Opposition to Defendants' Joint Motion for Summary Judgment of Invalidity and to Dismiss Plaintiffs' Request for Provisional Remedies and Enhanced Damages for Willful Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 150 pages, Document No. 1030.

Defendants' Motion to Compel Proper Responsive Deposition Testimony of Peter Hagerty Re: U.S. Pat. No. 8,168,037 Litigation, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 11, 2013; 3 pages, Document No. 975.

Notice of Expert Report Service and Request for Status Conference, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 16, 2013; 2 pages, Document No. 1059.

Adkins's Combined Memorandum of Law Stating Adkins-Specific Arguments in Opposition to Cleantech's Motion for Summary Judgment of Infringement and in Support of Adkins's Motion for Summary Judgment on Unclean Hands, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 24, 2013; 17 pages, Document No. 946.

GS Cleantech Corporation's Consolidated Reply Memorandum in Support of its Motion for Summary Judgment of Infringement and Opposition to Individual Defendants' Motions for Summary Judgment, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 25, 2013; 77 pages, Document No. 1032.

Defendants Aemetis Inc., and Aemetis Advanced Fuels Keyes, Inc.'s Reply to Plaintiff's Resistance to Motion for Suggestion for Remand, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML: dated Oct. 17, 2013; 7 pages, Document No. 979.

GS Cleantech Corporation's Surreply in Response to Defendants' Joint Reply in Support of Defendants' Motion for Summary Judgment of Invalidity and NonInfringement of U.S. Pat. No. 8,168,037 and Surreply in Response to Plaintiff's Motion for Summary Judgment of Infringement of U.S. Pat. No. 8,168,037, filed in the U.S.D.C.,Southern District of Indiana, Indianapolis, Division; Master Case. No. 1:10-ml-02181-LJM-DML; dated Apr. 24, 2014; 8 pages, Document No. 1191.

Adkins LLC's Motion for Summary Judgment on its Fourth Affirmative Defense of Unclean Hands Under FED. R. CIV . p. 56, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 23, 2013; 3 pages, Document No. 925.

Defendants Aemetis, Inc., and Aemetis Advanced Fuels Keyes, Inc's Brief in Support of Motion for Suggestion for Remand filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; Associated Case Nos. 1:13-CV-8014-LJM-DML; dated Sep. 19, 2013; 12 pages, Document No. 918; Certificate of Service, 4 pages (pp. 9-12).

Defendant Al-Corn Clean Fuel Motion for Summary Judgment of Non-Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 23, 2013; 6 pages, Document No. 931.

Al-Corn Clean Fuel's Motion for Summary Judgment of Non-Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 23, 2013; 3 pages, Document No. 933.

Defendants Aemetis, Inc., and Aemetis Advanced Fuels Keyes, Inc's Motion for Suggestion for Remand filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; Associated Case Nos. 1:13-CV-8014-LJM-DML dated Sep. 19, 2013; 6 pages, Document No. 917; Certificate of Service, 3 pages (pp. 4-6).

GS Cleantech Corporation's Motion for Summary Judgment of Infringement of U.S. Pat. No. 8,168,037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 23, 2013; 3 pages, Document No. 981.

Separate Opposition Brief of Cardinal Ethanol, LLC to Plaintiff GS Cleantech Corporation's Motion for Summary Judgment of Infringement, filed in the United States District Court, Southern District of Indiana, Indianapolis, Division, in re: Method of Processing Ethanol

(56) References Cited

OTHER PUBLICATIONS

Byproducts and Related Subsystems ('858) Patent Litigation; Master Case. No. 1:10-ml-02181-LJM-DML: dated Sep. 23, 2013; 9 pages, Document No. 924.

Corrected Notice of Expert Report Service and Request for Status Conference, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 16, 2013; 2 pages, Document No. 1060.

Declaration of Anthony C. Decinque, Esq. in Support of GEA Mechanical Equipment US Inc.'s Motion for Summary Judgment on the Issue of its Liability for Inducing or Contributing to Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 23, 2013; 3 pages, Document No. 936.

Declaration of John M. Weyrauch in Support of Request for Reimbursement of Costs and Attorney's Fees, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 6 pages, Document No. 1004.

Defendant Flottweg Separation Technology, Inc.'s Document Production Status Report, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 9, 2013; 4 pages, Document No. 1056.

Defendants' Reply to Plaintiff's Opposition to Defendants' Motion to (1) Compel Inspection by Forensics Experts of Alleged "Original" Ink Signed Jul. 31, 2013 Letter, (2) for Leave to Serve Forensic Expert Reports on When Said "Original" was Created, and/or (3) for Sanctions Against Plaintiff for Discovery Delay in Producing the "Original" Letter, filed in the United States District Court, Southern District of Indiana, Indianapolis, Division; Master Case. No. 1:10-ml-02181-LJM-DML; dated Oct. 1, 2013; 3 pages, Document No. 965.

Defendant's Joint Motion for Summary Judgment of Invalidity and to Dismiss Plaintiff's Claim for Provisional Remedies and Damages for Willful Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 23, 2013; 5 pages, Document No. 940.

Designation of Evidence by Defendants in Support of Defendants' Motion for Summary Judgment, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 24, 2013; 13 pages, Document No. 945.

Designation of Evidence in Support of Adkins's Motion for Summary Judgment on Unclean Hands, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 24, 2013; 4 pages, Document No. 947.

GEA Mechanical Equipment US Inc.'s Brief in Support of its Motion for Summary Judgment on the Issue of Liability for Inducing or Contributing to Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 23, 2013; 20 pages, Document No. 935.

Defendant GEA Mechanical Equipment US, Inc.'s Motion for Summary Judgment on the Issue of its Liability for Inducing or Contributing to Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 23, 2013; 3 pages, Document No. 934.

GEA Mechanical Equipment US, Inc.'s Designation of Evidence in Support of its Motion for Summary Judgment on the Issue of its Liability for Inducing or Contributing to Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 23, 2013; 20 pages, Document No. 937.

GS Cleantech Corporation's Answer to Aemetis, Inc. and Aemetis Advanced Fuels Keyes, Inc.'s Counterclaims, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 4, 2013; 6 pages, Document No. 968.

Plaintiff's GS Cleantech Corporation Cross Motion for Summary Judgment of no Invalidity Under 35. U.S.C 112 Against Bushmills Ethanol, Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1005.

Plaintiff's GS Cleantech Corporation Cross Motion for Summary Judgment of no Invalidity Under 35 U.S.C 112 Against Cardinal Ethanol, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; date Nov. 22, 2013; 3 pages, Document No. 1009.

Plaintiff's GS Cleantech Corporation Cross Motion for Summary Judgment of no Invalidity Under 35 U.S.C 112 Against Big River Resources West Burlington, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; date Nov. 22, 2013; 3 pages, Document No. 1013.

Plaintiff's GS Cleantech Corporation Cross Motion for Summary Judgment of no Invalidity Under 35 U.S.C 112 Against Al-Corn Clean Fuel, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1019.

Plaintiff's GS Cleantech Corporation Cross Motion for Summary Judgment of no Invalidity Under 35 U.S.C 112 Against Big River Resources Galva, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1018.

Plaintiff's GS Cleantech Corporation Cross Motion for Summary Judgment of no Invalidity Under 35 U.S.C 112 Lincolnway Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML: dated Nov. 22, 2013; 3 pages, Document No. 1017.

Plaintiff's GS Cleantech Corporation Cross Motion for Summary Judgment of no Invalidity Under 35 U.S.C 112 Against Chippewa Valley Ethanol Company, LLLP, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1010.

Plaintiff's GS Cleantech Corporation Cross Motion for Summary Judgment of no Invalidity Under 35 U.S.C 112 Against Adkins Energy, LLC, filed in the United States District Court, Southern District of Indiana, Indianapolis, Division, in re: Method of Processing Ethanol Byproducts and Related Subsystems ('858) Patent

(56) References Cited

OTHER PUBLICATIONS

Litigation; Master Case. No. 1:10-ml-02181-LJM-DML; dated Nov. 22, 2013; 3 pages, Document No. 1011.

Plaintiff's GS Cleantech Corporation Cross Motion for Summary Judgment of no Invalidity Under 35 U.S.C 112 Lincolnland Agri-Energy, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1012.

Plaintiff's GS Cleantech Corporation Cross Motion for Summary Judgment of no Invalidity Under 35 U.S.C 112 Against Blue Flint Ethanol, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1014.

Plaintiff's GS Cleantech Corporation Cross Motion for Summary Judgment of no Invalidity Under 35 U.S.C 112 Against United Wisconsin Grain Producers, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1015.

Plaintiff's GS Cleantech Corporation Cross Motion for Summary Judgment of no Invalidity Under 35 U.S.C 112 Against Ace Ethanol, LLC, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML: dated Nov. 22, 2013; 3 pages, Document No. 1016.

Plaintiff's GS Cleantech Corporation Cross Motion for Summary Judgment of no Invalidity Under 35 U.S.C 112 Against Flottweg Separation Technology Inc., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 3 pages, Document No. 1023.

GS Cleantech Corporation's Motion for Summary Judgment of Infringement of U.S. Pat. No. 8,168,037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 23, 2013; 3 pages, Document No. 983.

GS Cleantech Corporation's Motion for Summary Judgment of Infringement of U.S. Pat. No. 8,168,037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 23, 2013; 3 pages, Document No. 984.

Plaintiff's Opposition to Defendants' Motion to (1) Compel Inspection by Forensics Experts of Alleged "Original" Ink Signed Jul. 31, 2003 Letter, (2) for Leave to Serve Forensic Expert Reports on When Said "Original" was Created, and/or (3) for Sanctions Against Plaintiffs for Discovery Delay in producing the "Original" Letter, filed in the United States District Court, Southern District of Indiana, Indianapolis, Division; Master Case. No. 1:10-ml-02181-LJM-DML; dated Sep. 30, 2013; 5 pages, Document No. 964.

GS Cleantech Corporation's Motion for Summary Judgment of Infringement of U.S. Pat. No. 8,168.037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 23, 2013; 3 pages, Document No. 982.

Iroquois Bio-Energy Company, LLC's Additional Opposition to G.S. Cleantech Corporation's Motion for Summary Judgment of Infringement by Plant Defendants and Iroquois' Additional Cross-Motion for Summary Judgment of Non-Infringement as to Certain patent Claims, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 23, 2013; 5 pages, Document No. 923.

Defendants GEA Mechanical Equipment US. Inc, et al., Motion to File Two Separate Briefs and Plaintiff's Opposition filed in the United States District Court, Southern District of Indiana, Indianapolis, Division; Master Case. No. 1:10-ml-02181-LJM-DML; dated Sep. 20, 2013; 6 pages, Document No. 919.

GEA Mechanical Equipment US. Inc, et al., Joint Motion for Additional Pages filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 20, 2013; 4 pages, Document No. 920.

Order Granting Joint Motion for Additional Pages in the United States District Court, Southern District of Indiana, Indianapolis, Division, in re: Method of Processing Ethanol Byproducts and Related Subsystems ('858) Patent Litigation; Case. No. 1:10-cv-0180-LJM-DML; dated Sep. 23, 2013; 4 pages, Document No. 921.

Lincolnway Energy LLC's Joinder Re Separate Opposition & Cross Motion by Iroquois Bio-Energy, LLC as to Claim 9 of the '516 Patent, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 23, 2013; 3 pages, Document No. 930.

Memorandum of Law in Support of Defendants' Motion for Summary Judgment of Non-Infringement and in Opposition to Plaintiff's Motions for Summary Judgment of Infringement, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Sep. 24, 2013; 56 pages, Document No. 951.

Stipulated Motion for Status Conference, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 12, 2013; 4 pages, Document No. 1057.

Notice of Filing of Official Transcript, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 1 page, Document No. 1006.

Official Reporter's Transcript of Markman Hearing Regarding U.S. Pat. No. 8,168,037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 22, 2013; 66 pages, Document No. 1007.

Order Granting Motion to Withdraw Appearance of R. Trevor Carter in the United States District Court, Southern District of Indiana, Indianapolis, Division, in re: Method of Processing Ethanol Byproducts and Related Subsystems ('858) Patent Litigation; Case. No. 1:10-cv-0180-LJM-DML; dated Dec. 27, 2010; 2 pages, Document No. 92.

Order Granting Defendants' Motion to File Two Separate Briefs and Plaintiff's Opposition in the United States District Court, Southern District of Indiana, Indianapolis, Division, in re: Method of Processing Ethanol Byproducts and Related Subsystems ('858) Patent Litigation; Case. No. 1:10-cv-0180-LJM-DML; dated Sep. 23, 2013; 6 pages, Document No. 922.

Reply Brief in Support of Defendants' Motion to Compel Proper and Complete Deposition Testimony of Peter Hagerty Re: U.S. Pat. No. 8,168,037 Litigation, filed in the United States District Court, Southern District of Indiana, Indianapolis, Division, in re: Method of Processing Ethanol Byproducts and Related Subsystems ('858)

(56) References Cited

OTHER PUBLICATIONS

Patent Litigation; Master Case. No. 1:10-ml-02181-LJM-DML; dated Oct. 31, 2013; 11 pages, Document No. 995.
GS Cleantech Corporation's Motion for Summary Judgment of Infringement of U.S. Pat. No. 8,168,037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Oct. 23, 2013; 3 pages, Document No. 980.
Bushmills Ethanol, Inc., Defendants, "Defendants Bushmills Ethanol, Inc., Chippewa Valley Ethanol Company LLLp, Heartland Corn Products and United Wisconsin Grain Products, LLC's Second Amended Preliminary Invalidity Contentions", filed in the United States District Court for the Southern District of Indiana Indianapolis Division, Case No. 1:10-ml-02181-LJM-DML, Associated Case No. 1:10-cv-08003-LJM-DML, Associate Case No. 1:10-cv-08004-LJM-DML, on Feb. 11, 2013; 253 pages including certificate of service and exhibits.
*GS Cleantech Corporation*; Plaintiff v. *Adkins Energy, LLC*, Defendant; "First Amended Complaint for Patent Infringement"; filed in the United States District Court for the Southern District of Indiana, Master Case No. 1:10-ml-2181-LJM-DML, on Feb. 27, 2012, Document 242; Case 1:10-ml-02181-LJM-DML 10 pgs.
*GS Cleantech Corporation*; Plaintiff vs. *Amaizing Energy, LLC*, Defendant; "First Amended Complaint for Patent Infringement"; filed in the United States District Court for the Southern District of Indiana, Master Case No. 1:10-ml-2181-LJM-DML, on Feb. 27, 2012, Document 233; Case 1:10-ml-02181-LJM-DML 12 pgs.
*GS CleanTech Corporation*; Plaintiff vs. *Big River Resources Galva, LLC and Big River Resources West Burlington, LLC* Defendants; "First Amended Complaint for Patent Infringement"; filed in the United States District Court for the Southern District of Indiana, Master Case No. 1:10-ml-2181-LJM-DML, on Feb. 27, 2012, Document 235; Case 1:10-ml-02181-LJM-DML 11 pgs.
*GS Cleantech Corporation*; Plaintiff v. *Big River Resources Galva, LLC and Big River Resources West Burlington, LLC*, Defendants; "Answer of Big River Resources Galva, LLC and Big River Resources West Burlington, LLC to Plaintiff GS CleanTech Corporations's First Amended Complaint for Patent Infringement"; filed in the United States District Court for the Southern District of Indiana, Master Case No. 1:10-ml-2181-LJM-DML, on Mar. 15, 2012, Document 260; Case 1:10-m1-02181-LJM-DML 11 pgs.
*GS CleanTech Corporation*; Plaintiff v. *Bushmills Ethanol, Inc.*, Defendant; "First Amended Complaint for Patent Infringement"; filed in the United States District Court for the Southern District of Indiana, Master Case No. 1:10-ml-2181-LJM-DML, on Feb. 27, 2012, Document 243; Case 1:10-ml-02181-LJM-DML 14 pgs.
*ICM, Inc., KMH*, Plaintiff v. *GS Cleantech Corporation—Greenshift Corporation*, Defendant; "First Amended Complaint for Declaratory Judgment"; filed in United States District Court, District of Kansas, Civil Action No. 09-1315-WEB-, on Oct. 14, 2009, Document 4; Case 6:09-cv-01315-WEB-KMH; 6 pgs.
*ICM*; Plaintiff vs. *GS CleanTech Corporation*, Defendant; "Fourth Amended Complaint for Declaratory Judgement Jury Trial Requested"; filed in the United States District Court for the Southern District of Indiana, Master Case No. 1:10-ml-2181-LJM-DML, on Mar. 15, 2012, Document 255; Case 1:10-ml-02181-LJM-DML 10 pgs.
Ace Ethanol LLC, et al., Memorandum of Law in Support of Motions for Summary Judgment of Non-Infringement filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 29, 2012, filed Jul. 3, 2012; 35 pages, Document No. 398; Certificate of Service, 3 pages (pp. 36-38), Appendix A, 4 pages (pp. 39-42).
Adkins Energy LLC's Supplemental Invalidity Contentions; filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; Associated Case No. 1:10-cv-08011-LJM-DML; dated Mar. 30, 2012, 4 pages; Certificate of Service, 3 pages (pp. 5-7).
Al-Corn Clean Fuel Amended Answer and Affirmative Defenses to GS Cleantech's First Amended Complaint and Amended Counterclaims; filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; Associated Case No. 1:10-cv-08004-LJM-DML; dated Apr. 20, 2012, 52 pages.
Amaizing Energy Holding Company Supplemental Preliminary Invalidity Contentions; filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; Associated Case No. 1:10-cv-08001-LJM-DML an d1:10-cv-08002-LJM-DML, and 1:10-cv-08004 LJM-DML; dated Mar. 26, 2012, 7 pages; Certificate of Service, 3 pages (pp. 8-10); Exhibit A, 10 pages (pp. 1-10).
Author Unknown, "Thermochemical Liquefaction" Wisconsin Biorefining Development Initiative, www.wisbiorefine.org. pp. 1-4, undated.
Singh, et al., "Extraction of Oil from Corn Distillers Dried Grains with Soluables" Transactions of the ASAE, 1998, vol. 41(6), pp. 1775-1777.
Chicago Board of Trade, "Chicago Board of Trade (CBOT) SoyBean Oil Prices" graph, constantly updated, 1 pg.
Digital Copy of a Book provided by Google—Thesis of Winfield, Harriet The oil of maize (*Zea mays*); Library of the University of Wisconsin, New York, 1899; pp. 1-61.
Bushmills Ethanol, Inc., Defendants, "Defendants Bushmills Ethanol, Inc., Chippewa Valley Ethanol Company LLP, Heartland Corn Products and United Wisconsin Grain Products, LLC's Second Amended Preliminary Invalidity Contentions", filed in the United States District Court for the Southern District of Indiana Indianapolis Division, Case No. 1:10-ml-02181-LJM-DML, Associated Case No. 1:10-cv-08003-LJM-DML, Associate Case No. 1:10-cv-08004-LJM-DML, on Feb. 11, 2013; 253 pages including certificate of service and exhibits.
Bushmills Ethanol, Inc., Chippewa Valley Ethanol Company, LLLP, Heartland Corn Products and United Wisconsin Grain Producers LLC, Amended Preliminary Invalidity Contentions; filed in the United States District Court; Southern District of Indiana; Indianapolis Division; in Re: Method of Processing Ethanol Byproducts and Related Subsystems (858) Patent Litigation; Master Case No. 1:10-ml-02181-LJM-DML; dated Oct. 22, 2012; 12 pages.
Declaration of David Fred Cantrell et al.; U.S. Appl. No. 13/107,197, filed May 13, 2011; dated Jul. 10, 2012; pp. 6.
Declaration of David Fred Cantrell dated Nov. 5, 2010 with Exhibits A and B; 9 pgs.
Email from David Cantrell to Gerald Winter and Jay Sommers with Copy to Mark Lauderbaugh, David Winsness, Whit Davis, Greg Barlage and Bent Ludvigsen entitled "Oil Recovery", dated Jun. 29, 2003; 1 page.
Email from David Cantrell to Gerald Winter and Jay Sommers entitled "VDS System Update", dated Jun. 5, 2003; 1 page; Attachment consisting of worksheet, 2 pages; (Email and Attachment, 3 pages total).
*GEA Westfalia Separator, Inc. and Ace Ethanol, LLC v. Greenshift Corporation*, Case No. 09 Civ. 7686 (LMM) ECF Case, First Amended Complaint, received in U.S. District Court S.D.N.Y, Oct. 13, 2009, pp. 1-36.
*GEA Westfalia Separator, Inc. v Greenshift Corporation*, Complaint, Case No. 1:09-cv-07686-LMM: filed Sep. 3, 2009, pp. 1-28, stamped by Judge McKenna.
*GS Cleantech Corporation*; Plaintiff vs. *Blue Flint Ethanol, LLC*, Defendant; "First Amended Complaint for Patent Infringement"; filed in the United States District Court for the Southern District of Indiana, Master Case No. 1:10-ml-2181-LJM-DML, on Feb. 27, 2012, Document 238; Case 1:10-ml-02181-LJM-DML 10 pgs.
*GS CleanTech Corporation*; Plaintiff v. *Cardinal Ethanol, LLC*, Defendant; "Answer of Cardinal Ethanol, LLC to Plaintiff GS CleanTech Corporation's First Amended Complaint for Patent Infringement"; filed in the United States District Court for the Southern

(56) References Cited

OTHER PUBLICATIONS

District of Indiana, Master Case No. 1:10-ml-2181-LJM-DML, on Mar. 15, 2012, Document 261; Case 1:10-ml-02181-LJM-DML 11 pgs.

*GS Cleantech Corporation*, Plaintiff, v. *Cardinal Ethanol, LLC*, Defendant, "Complaint for Patent Infringement", filed in United State District Court for the Southern District of Indianapolis Division, Civil Action No. 1:10-cv-0180LJM-DML; on Feb. 11, 2010; Document 1; Case No. 1:10-cv-00180-LJM-DML, 9 pgs.

*GS CleanTech Corporation*; Plaintiff vs. *Flotwegg Separation Technology, Inc.*, Defendant; "Second Amended Complaint for Patent Infringement"; filed in the United States District Court for the Southern District of Indiana, Master Case No. 1:10-ml-2181-LJM-DML, on Feb. 27, 2012, Document 237; Case 1:10-ml-02181-LJM-DML 12 pgs.

*GS CleanTech Corporation*; Plaintiff v. *Iroquois Bio-Energy Company, LLC*, Defendant; "First Amended Complaint for Patent Infringement"; filed in the United States District Court for the Southern District of Indiana, Master Case No. 1:10-ml-2181-LJM-DML, on Feb. 27, 2012, Document 240; Case 1:10-ml-02181-LJM-DML 10 pgs.

*GS CleanTech Corporation*; Plaintiff vs. *Iroquois Bio-Energy Company, LLC*, Defendant; Iroquois Bio-Energy Company, LLC's Answer and Affirmative Defenses to GS CleanTech Corporation's First Amended Complaint for Patent Infringement; filed in the United States District Court for the Southern District of Indiana, Master Case No. 1:10-ml-2181-LJM-DML, on Mar. 15, 2012, Document 259; Case 1:10-ml-02181-LJM-DML 11 pgs.

*GS CleanTech Corporation*; Plaintiff v. *Lincolnland Agri-Energy, LLC*, Defendant; "Answer of Lincolnland Agri-Energy, LLC to Plaintiff GS CleanTech Corporation's Second Amended Complaint for Patent Infringement"; filed in the United States District Court for the Southern District of Indiana, Master Case No. 1:10-ml-2181-LJM-DML, on Mar. 15, 2012, Document 262; Case 1:10-ml-02181-LJM-DML 10 pgs.

*GS CleanTech Corporation*; Plaintiff v. *Lincolnland Agri-Energy, LLC*, Defendant; "Second Amended Complaint for Patent Infringement"; filed in the United States District Court for the Southern District of Indiana, Master Case No. 1:10-ml-2181-LJM-DML, on Feb. 27, 2012, Document 241; Case 1:10-ml-02181-LJM-DML 10 pgs.

*GS Cleantech Corporation*; Plaintiff v. *United Wisconsin Grain Producers, LLC*, Defendant; "First Amended Complaint for Patent Infringement"; filed in the United States District Court for the Southern District of Indiana, Master Case No. 1:10-ml-2181-LJM-DML, on Feb. 27, 2012, Document 239; Case 1:10-ml-02181-LJM-DML 10 pgs.

Icm, Inc., David Vander Griend, Cardinal Ethanol, LLC, Big River Resources Galva, LLC, Big River Resources West Burlington, LLC and Lincolnland Agri-Energy, LLC., Defendants, "Amended Invalidity Contentions for the '858, '516, '517 and '484 Patents", filed in the United States District Court for the Southern District of Indiana Indianapolis Division, Case No. 1:10-ml-02181-LJM-DML, on Feb. 11, 2013; 10 pages including certificate of service.

ICM Inc, and ICM-related Ethanol Plant Defendants Memorandum in Support of Their Motion for Summary Judgment of Non-Infringement; filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated May 23, 2012, 25 pages; Certificate of Service, 1 page (p. 26).

Icm, Inc., Cardinal Ethanol, LLC, Big River Resources Galva, LLC, Big River Resources West Burlington, LLC and Lincolnland Agri-Energy, LLC, for the '516 and' 517 Patents; filed in the United States District Court; Southern District of Indiana; Indianapolis Division; Preliminary Invalidity Contentions in Re: Method for Processing Ethanol Byproducts and Related Subsystems ('858) Patent Litigation; 1:10-ml-02181-LJM-DML; dated Oct. 15, 2012, 10 pages.

Lincolnway Energy LLC Preliminary Invalidity Contentions regarding U.S. Pat. No. 8,168,037; filed in the United States District Court for the Southern District of Indiana; Indianapolis Division; in Re: Method of Processing Ethanol Byproducts and Related Subsystems ('858) Patent Litigation; Master Case. No. 1:10-ml-02181-LJM-DML; Associated Case No. 1:10-CV-08001-LJM-DML: dated Dec. 24, 2012; 46 pages.

Notice of Allowance for U.S. Appl. No. 12/559,136, filed Sep. 14, 2009; First Named Inventor: David Fred Cantrell; Mailing Date: Jan. 21, 2011; 12 pgs.

Notice of Allowance; U.S. Appl. No. 11/241,231, filed Sep. 30, 2005; First Named Inventor: David Fred Cantrell; Mail Date: Feb. 17, 2010; 4 pgs.

Notice of Allowance for U.S. Appl. No. 11/688,425, filed Mar. 20, 2007; First Named Inventor: David J. Winsness; Mail Date: Mar. 5, 2009; 7 pgs.

Notice of Allowance; U.S. Appl. No. 11/122,859, filed May 5, 2005; First Named Inventor: David Fred Cantrell; Mail Date: Apr. 8, 2009; 4 pgs.

Notice of Allowance for U.S. Appl. No. 13/107,197, filed May 13, 2011; First Named Inventor: David Fred Cantrell; Mailing Date: Apr. 13, 2012; 5 pgs.

Notice of Allowance for U.S. Appl. No. 12/559,136, filed Sep. 14, 2009; First Named Inventor: David Fred Cantrell; Mailing Date: Jun. 24, 2011; 14 pgs.

Notice of Allowance for U.S. Appl. No. 11/241,231, filed Sep. 30, 2005; Inventor: David Fred Cantrell; Mailing Date: Aug. 11, 2010; 8 pgs.

Notice of Allowance; U.S. Appl. No. 11/688,425, filed Mar. 20, 2007; First Named Inventor: David J. Winsness; Mail Date: Aug. 10, 2009; 9 pgs.

Notice of Allowance; U.S. Appl. No. 11/122,859, filed May 5, 2005; First Named Inventor: David Fred Cantrell; Mail Date: Aug. 25, 2009; 12 pgs.

Notice of Allowance for U.S. Appl. No. 13/107,197, filed May 13, 2011; First Named Inventor: David Fred Cantrell; Date of Mailing: Sep. 4, 2012; 9 pgs.

Notice of Allowance for U.S. Appl. No. 11/856,150, filed Sep. 17, 2007; First Named Inventor: David J. Winsness; Mailing Date: Dec. 21, 2011; 8 pgs.

Notice of Allowance—Supplemental; U.S. Appl. No. 11/688,425, filed Mar. 20, 2007; First Named Inventor: David J. Winsness; Mail Date: Apr. 21, 2009; 5 pgs.

Office Action—Advisory Action for U.S. Appl. No. 11/908,891, filed Sep. 17, 2007; First Named Inventor: David J. Winsness; Mailing Date: May 31, 2012; 5 pgs.

Office Action—Final for U.S. Appl. No. 11/856,150, filed Sep. 17, 2007; First Named Inventor: David J. Winsness; Mail Date: Feb. 25, 2011; 9 pgs.

Office Action—Final for U.S. Appl. No. 11/908,891, filed Sep. 17, 2007; First Named Inventor: David J. Winsness; Mailing Date: Mar. 21, 2012; 10 pages.

Office Action—Final for U.S. Appl. No. 11/908,891, filed Sep. 17, 2007; First Named Inventor: David J. Winsness; Mailing Date: May 9, 2013; 24 pages.

Office Action—Non-Final; U.S. Appl. No. 11/241,231, filed Sep. 30, 2005; First Named Inventor: David Fred Cantrell; Mail Date: Jan. 4, 2010; 5 pgs.

Office Action—Final for U.S. Appl. No. 13/450,991, filed Apr. 19, 2012; First Named Inventor: David J. Winsness; Mailing Date May 31, 2013; 16 pages.

Office Action—Final for U.S. Appl. No. 11/908,891, filed Sep. 17, 2007; First Named Inventor: David J. Winsness; Mailing Date: Dec. 22, 2010; 13 pgs.

Office Action—Final; U.S. Appl. No. 11/241,231, filed Sep. 30, 2005; Inventor David Fred Cantrell; Mail Date: Dec. 26, 2008; 10 pgs.

Office Action—Non-Final for U.S. Appl. No. 12/559,136, filed Sep. 14, 2009; First Named Inventor: David Fred Cantrell; Mailing Date: Apr. 2, 2010; 17 pgs.

Adkins Energy, LLC, Defendants, "Second Supplemental Preliminary Invalidity Contentions", filed in the United States District Court for the Southern District of Indiana Indianapolis Division,

(56) References Cited

OTHER PUBLICATIONS

Case Nos. 1:10-ml-0218-LJM-DML and 1:10-CV-08011-LJM-DML, on Oct. 15, 2012, 17 pages including certificate of service. Defendants', Bushmills Ethanol, Inc., Chippewa Valley Ethanol Company, LLLP, Heartland Corn Products and United Wisconsin Grain Producers LLC, Amended Preliminary Invalidity Contentions; filed in the United States District Court; Southern District of Indiana; Indianapolis Division; In Re: Method of Processing Ethanol Byproducts and Related Subsystems (858) Patent Litigation; Master Case No. 1:10-ml-02181-LJM-DML; dated Oct. 15, 2012; 12 pages.

GEA Mechanical Equipment US, Inc. and Ace Ethanol LLC.'s Preliminary Invalidity Contentions, filed in the United States District Court for the Southern District of Indiana; Indianapolis Division; In Re: Method of Processing Ethanol Byproducts and Related Subsystems ('858) Patent Litigation; 1:10-ml-02181-LJM-DML; filed Oct. 15, 2012; 140 pages.

Lincolnway Energy LLC Preliminary Invalidity Contentions; filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; Associated Case No. 5:10-cv-4036; filed Oct. 15, 2012, 17 pages; Exhibit A, pp. 3 pages and Exhibit B, 4 pages, ( pp. 275-278).

Preliminary Invalidity Contentions of Defendants ICM, Inc., Cardinal Ethanol, LLC, Big River Resources Galva, LLC, Big River Resources West Burlington, LLC and Lincolnland Agri-Energy, LLC, for the '516 and' 517 Patents; filed in the United States District Court; Southern District of Indiana; Indianapolis Division; In Re: Method for Processing Ethanol Byproducts and Related Subsystems ('858) Patent Litigation; 1:10-ml-02181-LJM-DML; dated Oct. 15, 2012, 10 pages.

Non-Final Office Action issued in U.S. Appl. No. 13/450,991 dated Nov. 16, 2012; 27 pages.

Office Action issued in Canadian Patent Application No. 2,576,895, dated Oct. 18, 2012; 3 pages.

Adkins Energy LLC., "Third Supplemental Preliminary Invalidity Contentions as to the '858, '516, '517 and '484 Patents", filed in he United States District Court for the Southern District of Indiana Indianapolis Division, Case Nos. 1:10-ml-02181-LJM-DML, Associated Case No. 1:10-cv-08011-LJM-DML on Feb. 11, 2013; 304 pages with certificate of service, appendix and exhibits.

Al-Corn Clean Fuels, "Amended Invalidity Contentions as to the '858, '516, '517 and '484 Patents", filed in he United States District Court for the Southern District of Indiana Indianapolis Division, Case No. 1:10-ml-02181-LJM-DML, Associated Case No. 1:10-cv-08004-LJM-DML on Feb. 15, 2013; 114 pages including exhibits.

Blue Flint Ethanol LLC., Defendants, "Preliminary Invalidity Contentions for the '858, '516, '517 and '484 Patents", filed in the United States District Court for the Southern District of Indiana Indianapolis Division, Case No. 1:10-ml-02181-LJM-DML, on Feb. 11, 2013; 10 pages including certificate of service.

Bushmills Ethanol, Inc., Defendants, "Defendants Bushmills Ethanol, Inc., Chippewa Valley Ethanol Company LLLp, Heartland Corn Products and United Wisconsion Grain Products, LLC's Second Amended Preliminary Invalidity Contentions", filed in the United States District Court for the Southern District of Indiana Indianapolis Division, Case No. 1:10-ml-02181-LJM-DML, Associated Case No. 1:10-cv-08003-LJM-DML, Associate Case No. 1:10-cv-08004-LJM-DML, on Feb. 11, 2013; 253 pages including certificate of service and exhibits.

GEA Mechanical Equipment US, Inc. and Ace Ethanol LLC., "Amended Invalidity Contentions for the '858, '516, '517 and '484 Patents", filed In he United States District Court for the Southern District of Indiana Indianapolis Division, Case No. 1:10-ml-02181-LJM-DML , on Feb. 11, 2013; 368 pages including certificate of service and exhibits.

Iroquois Bio-Engergy Company, LLC, "Amended Invalidity Contentions for the '858, '516, '517 and '484 Patents", filed in the United States District Court for the Southern District of Indiana Indianapolis Division, Case No. 1:10-ml-02181-LJM-DML, on Feb. 11, 2013; 45 pages including exhibits.

Linconlway Engergy—LLC,., "Amended and Supplemental Invalidity Contentions for the '858, '517, '516 and '484 Patents", filed in the United States District Court for the Southern District of Indiana Indianapolis Division, Case No. 1:10-ml-2181-LJM-DML, related to U.S.DC ND Iowa Civil No. 5:10-cv-4036, on Feb. 11, 2013; 16 pages including certificate of service.

Linconlway Energy's Supplemental Claim Chart re: Claims 8 & 9 Invalidity Contentions, filed with the Supplemental Invalidity Contentions in the United States District Court for the Southern District of Indiana Indianapolis Division, Case No. 1:10-ml-2181-LJM-DML, related to USDC ND Iowa Civil No. 5:10-cv-4036, on Feb. 11, 2013; 10 pages.

Non-Final Office Action issued in U.S. Appl. No. 13/450,991, dated Nov. 16, 2012; 28 pages.

Office Action—Non-Final; U.S. Appl. No. 11/241,231, filed Sep. 30, 2005; Inventor David Fred Cantrell; Mail Date: Jun. 17, 2008; 11 pgs.

Office Action—Non-Final for U.S. Appl. No. 12/559,136, filed Sep. 14, 2009; First Named Inventor: David Fred Cantrell; Mail Date: Jul. 6, 2010.

Office Action—Non-Final for U.S. Appl. No. 11/908,891, filed Sep. 17, 2007; First Named Inventor: David J. Winsness; Mail Date: Jul. 13, 2010.

Office Action—Non-Final for U.S. Appl. No. 11/856,150, filed Sep. 17, 2007; First Named Inventor: David J. Winsness; Mail Date: Aug. 13, 2010.

Office Action—Non-Final for U.S. Appl. No. 11/241,231, filed Sep. 30, 2005, Inventor David Fred Cantrell, Mail Date: Aug. 20, 2009; 16 pgs.

Office Action—Non-Final; U.S. Appl. No. 11/856,150, filed Sep. 17, 2007, Inventor David J. Winsness, Mail Date: Aug. 28, 2009; 13 pgs.

Office Action—Non-Final for U.S. Appl. No. 11/688,425, filed Mar. 20, 2007; First Named Inventor: David J. Winsness; Mail Date Oct. 31, 2007; 11 pgs.

Office Action—Final for U.S. Appl. No. 11/908,891, filed Sep. 17, 2007; First Named Inventor: David J. Winsness; Mailing Date: Nov. 23, 2011; 16 pgs.

Office Action—Non-Final for U.S. Appl. No. 11/908,891, filed Sep. 17, 2007; First Named Inventor: David J. Winsness; Mailing Date: Nov. 26, 2012; 13 pgs.

Office Action—Non-Final for U.S. Appl. No. 11/856,150, filed Sep. 17, 2007; First Named Inventor: David J. Winsness; Mailing Date: Nov. 28, 2011; 14 pgs.

Office Action—Non-Final for U.S. Appl. No. 13/107,197, filed May 13, 2011; First Named Inventor: David Fred Cantrell; Mailing Date: Dec. 13, 2011; 28 pgs.

Office Action—Restriction/Election; U.S. Appl. No. 11/122,859, filed May 5, 2005; First Named Inventor: David Fred Cantrell; Mail Date: Feb. 5, 2008; 7 pgs.

Office Action—Election/Restriction; U.S. Appl. No. 11/241,231, filed Sep. 30, 2005; First Named Inventor: David Fred Cantrell; Mail Date: May 6, 2008; 7 pgs.

Office Action—Restriction/Election for U.S. Appl. No. 11/122,859, filed May 5, 2005; First Named Inventor: David Fred Cantrell; Mail Date: Jun. 13, 2008; 7 pgs.

Office Action—Restriction/Election; U.S. Appl. No. 11/908,891, filed Sep. 17, 2007; First Named Inventor: David J. Winsness; Mail Date: Aug. 26, 2009.

Office Action—Restriction/Election; U.S. Appl. No. 11/688,425, filed Mar. 20, 2007; First Named Inventor: David J. Winsness; Mail Date: Sep. 26, 2007.

International Preliminary Report on Patentability for Search Report for PCT/US2005/028937 dated Feb. 20, 2007.

Search Report for PCT/US07/62301; Applicant: GS Industrial Design Inc., Date of Mailing Mar. 11, 2008; 12 pages.

European Search Report for Application No. 05786802.8-2113—PCT/US2005028937; dated Aug. 20, 2008; 6 pages.

Iroquois Bio-Energy Company LLC., Memorandum in Support of its Motion for Summary Judgment of Non-Infringement; filed in the United States District Court, Southern District of Indiana, India-

(56) References Cited

OTHER PUBLICATIONS napolis, Division, in re: Method of Processing Ethanol Byproducts and Related Subsystems ('858) Patent Litigation; Master Case. No. 1:10-ml-02181-LJM-DML; Document No. 362; dated May 23, 2012, 27 pages; Certificate of Service, 1 page (pp. 28).

Lincolnway Energy LLC Preliminary Invalidity Contentions; filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; Associated Case No. 5:10-cv-4036; filed Oct. 15, 2012, 17 pages; Exhibit A, pp. 3 and Exhibit B, 4 pages, ( pp. 275-278).

Blue Flint Ethanol, LLC's Amended Preliminary Invalidity Contentions; filed in the United States District Court; Southern District of Indiana; Indianapolis Division; In Re: Method or Processing Ethanol Byproducts and Related Subsystems ('858') Patent Litigation; Case No. 1:10-ml-02181-LJM-DML, Associated Case No. 1:10-cv-8002-LJM-DML; dated Sep. 17, 2013; 2 pages.

Preliminary Invalidity Contentions by Lincolnway Energy LLC; filed in the United States District Court; Southern District of Indiana; Indianapolis Division; In Re: Method or Processing Ethanol Byproducts and Related Subsystems ('858') Patent Litigation; Case No. 1:10-ml-2181-LJM-DML, USDC ND Iowa Civil No. 5:10-cv-4036; dated Sep. 17, 2013; 31 total pages ('037 Patent Further Amended & Supplemented Invalidity Claim Chart) included.

Ace Ethanol LLC, "Ace Ethanol LLC, Amended Appendix B. Statement of Disputed Facts," filed in the United States District Court for the Southern District of Indiana Indianapolis Division, Case No. 1:10-ml-02181-LJM-DML, on Nov. 21 2012; 4 pages.

Ace Ethanol LLC, "Memorandum of Law in Support of Motion for Summary Judgment of Non-Infringement by Ace Ethanol, LLC, Al-Corn Clean Fuel, Blue Flint Ethanol, LLC, Bushmills Ethanol, Inc., Chippewa Valley Ethanol Company, LLLP, Heartland Corn Products, Lincolnway Energy, LLC, and United Wisconsin Grain Producers LLC," filed in the United States District Court for the Southern District of Indiana Indianapolis Division, Case No. 1:10-ml-02181-LJM-DML, on Jul. 3, 2012; 45 pages.

Adkins Energy LLC, "Adkins Combined Memorandum of Law Stating Adkins-Specific Arguments in Opposition to Cleantech's Motion for Summary Judgment of Infringement and in Support of Adkins's Motion for Summary Judment on Unclean Hands," filed in the United States District Court for the Southern District of Indiana Indianapolis Division, Case No. 1:10-ml-02181-LJM-DML, on Sep. 24, 2013; 17 pages including certificate of service.

Adkins Energy LLC, "Adkins Memorandum of Law in Opposition to Cleantech's Motion for Summary Judgment," filed in the United States District Court for the Southern District of Indiana Indianapolis Division, Case No. 1:10-ml-02181-LJM-DML, on Mar. 26, 2013; 41 pages including certificate of service.

Amendment to Final Office Action Filed in U.S. Appl. No. 11/908,891 on Nov. 8, 2013; 14 pages.

Adkins Energy LLC, "Adkins Energy LLC's Memorandum in Opposition to GS Cleantech's Motion for Summary Judgment of Infringement," filed in the United States District Court for the Southern District of Indiana Indianapolis Division, Case No. 1:10-ml-02181-LJM-DML, on Nov. 26, 2012; 11 pages including certificate of service.

Cardinal Ethanol LLC, "Separate Opposition Brief of Cardinal Ethanol, LLC to Plaintiff GS Cleantech's Motion for Summary Judgment of Infringement," filed in the United States District Court for the Southern District of Indiana Indianapolis Division, Case No. 1:10-ml-02181-LJM-DML, on Nov. 15, 2012; 8 pages.

"Defendant's (With the Exception of Adkins Energy) Joint Reply in Support of Their Respective Motions for Summary Judgment of Noninfringement," filed in the United States District Court for the Southern District of Indiana Indianapolis Division, Case No. 1:10-ml-02181-LJM-DML, on Sep. 7, 2012; 37 pages including certificate of service.

GEA Mechanical Equipment US, Inc., "GEA Mechanical Equipment US Inc.'s Notice RE Non-Joinder of Defendant Ace Ethanol, LLC's Motion for Summary Judgment of Non-Infringment" filed in the United States District Court for the Southern District of Indiana Indianapolis Division, Case No. 1:10-ml-02181-LJM-DML, on Oct. 12, 2012; 2 pages.

GEA Mechanical Equipment US, Inc., "GEA Mechanical Equipment US Inc.'s Brief in Support of its Motion for Summary Judgment on the Issue of Liability for Inducing or Contributing to Infringement," filed in the United States District Court for the Southern District of Indiana Indianapolis Division, Case No. 1:10-ml-02181-LJM-DML, on Sep. 23, 2013; 20 pages.

GEA Mechanical Equipment US, Inc., and Ace Ethanol, LLC, Corrected Memorandum of Law in Support of Defendants' Joint Motion for Summary Judgment of Invalidity and to Dismiss Plaintiff's Request for Provisional Remedies and Enhanced Damages for Willful Infringement, filed in the United States District Court for the Southern District of Indiana Indianapolis Division, Case No. 1:10-ml-02181-LJM-DML, on Oct. 4, 2013; 138 pages.

GEA Mechanical Equipment US, Inc., and Ace Ethanol, LLC, "Memorandum of Law in Support of Defendants' Joint Motion for Summary Judgment of Invalidity and to Dismiss Plaintiff's Request for Provisional Remedies and Enhanced Damages for Willful Infringement," filed in the United States District Court for the Southern District of Indiana Indianapolis Division, Case No. 1:10-ml-02181-LJM-DML, on Sep. 24, 2013, 139 pages.

GS Cleantech Corporation's, "GS Cleantech Corporation's Memorandum of Law in Opposition to Motions for Summary Judgment of Noninfringement by Ace Ethanol, LLC, Al-Corn Clean Fuel, Blue Flint Ethanol, LLC, Bushmills Ethanol, Inc., Chippewa Valley Ethanol Company, LLLP, Heartland Corn Products, Lincolnway Energy, LLC, and United Wisconsin Grain Producers LLC," filed in the United States District Court for the Southern District of Indiana Indianapolis Division, Case No. 1:10-ml-02181-LJM-DML, on Jul. 30, 2012; 49 pages including certificate of service.

GS Cleantech Corporation's, "GS Cleantech Corporation's Memorandum of Law in Opposition to Motions for Summary Judgment of Noninfringement by ICM, Inc., David Vander Griend, Cardinal Ethanol, LLC, Big River Resources West Burlington, LLC, Big River Resources Galva, LLC and Lincolnland Agri-Energy, LLC" filed in the United States District Court for the Southern District of Indiana Indianapolis Division, Case No. 1:10-ml-02181-LJM-DML, on Jul. 25, 2012; 40 pages.

GS Cleantech Corporation's, "GS Cleantech Corporation's Memorandum of Law in Opposition to Defendant Iroquois Bio-Energy, LLC's Motion for Summary Judgment of Non-Infringement," filed in the United States District Court for the Southern District of Indiana Indianapolis Division, Case No. 1:10-ml-02181-LJM-DML, on Jul. 25, 2012; 32 pages including certificate of service.

GS Cleantech Corporation's, "GS Cleantech Corporation's Motion to Strike Defendants ICM, Inc., David Vander Griend, Cardinal Ethanol, LLC, Big River Resources West Burlington, LLC, Big River Resources Galva, LLC, and Lincolnland Agri-Energy, LLC's Motion for Summary Judgment of Non-Infringement," filed in the United States District Court for the Southern District of Indiana Indianapolis Division, Case No. 1:10-ml-02181-LJM-DML, on Jun. 5, 2012; 3 pages.

GS Cleantech Corporation's, "GS Cleantech Corporation's Memorandum of Law in Support of Motion for Summary Judgment of Infringement by Adkins Energy, LLC," filed in the United States District Court for the Southern District of Indiana Indianapolis Division, Case No. 1:10-ml-02181-LJM-DML, on Sep. 14, 2012; 25 pages including certificate of service.

GS Cleantech Corporation's, "GS Cleantech Corporation's Memorandum of Law in Support of Motion for Summary Judgment of Infringement by Al-Corn Clean Fuel," filed in the United States District Court for the Southern District of Indiana Indianapolis Division, Case No. 1:10-ml-02181-LJM-DML, on Sep. 14, 2012; 28 pages including certificate of service.

GS Cleantech Corporation's, "GS Cleantech Corporation's Memorandum of Law in Support of Motion for Summary Judgment of Infringement by Big River Resources West Burlington, LLC," filed in the United States District Court for the Southern District of Indiana Indianapolis Division, Case No. 1:10-ml-02181-LJM-DML, on Sep. 14, 2012; 30 pages including certificate of service.

(56) References Cited

OTHER PUBLICATIONS

GS Cleantech Corporation's, "GS Cleantech Corporation's Memorandum of Law in Support of Motion for Summary Judgment of Infringement by Ace Ethanol, LLC," filed in the United States District Court for the Southern District of Indiana Indianapolis Division, Case No. 1:10-ml-02181-LJM-DML, on Sep. 14, 2012; 31 pages including certificate of service.
GS Cleantech Corporation's, "GS Cleantech Corporation's Memorandum of Law in Support of Motion for Summary Judgment of Infringement by Big River Resources Galva, LLC," filed in the United States District Court for the Southern District of Indiana Indianapolis Division, Case No. 1:10-ml-02181-LJM-DML, on Sep. 14, 2012; 25 pages including certificate of service.
GS Cleantech Corporation's, "GS Cleantech Corporation's Memorandum of Law in Support of Motion for Summary Judgment of Infringement by Lincolnland Agri-Energy, LLC," filed in the United States District Court for the Southern District of Indiana Indianapolis Division, Case No. 1:10-ml-02181-LJM-DML, on Sep. 14, 2012; 30 pages including certificate of service.
GS Cleantech Corporation's, "Plaintiff's Memorandum in Opposition to Defendants' Joint Motion for Summary Judgment of Invalidity and to Dismiss Plaintiffs' Request for Provisional Remedies and Enhances Damages for Willful Infringement," filed in the United States District Court for the Southern District of Indiana Indianapolis Division, Case No. 1:10-ml-02181-LJM-DML, on Nov. 22, 2013; 150 pages.
GS Cleantech Corporation's, "Memorandum of Law in Support of its Motions for Summary Judgment of Infringement by the '037 Plant Defendants," filed in the United States District Court for the Southern District of Indiana Indianapolis Division, Case No. 1:10-ml-02181-LJM-DML, on Oct. 23, 2013; 42 pages.
GS Cleantech Corporation's, "Memorandum of Law in Support of its Motion for Summary Judgment of Infringement by Plant Defendants," filed in the United States District Court for the Southern District of Indiana Indianapolis Division, Case No. 1:10-ml-02181-LJM-DML, on Jul. 23, 2013; 107 pages.
GS Cleantech Corporation's, Consolidated Reply memorandum in Support of its Motion for Summary Judgment of Infringement and Opposition to Individual Defendant's Motions for Summary Judgment, filed in the United States District Court for the Southern District of Indiana Indianapolis Division, Case No. 1:10-ml-02181-LJM-DML, on Nov. 25, 2013; 77 pages.
GS Cleantech Corporation's, "GS Cleantech Corporation's Memorandum of Law in Support of Motion for Summary Judgment on Count 1 of Adkins Energy LLC's Counterclaims for Breach of Contract (and Related Affirmative Defenses)," filed in the United States District Court for the Southern District of Indiana Indianapolis Division, Case No. 1:10-ml-02181-LJM-DML, on Feb. 19, 2013; 41 pages.
GS Cleantech Corporation's, "GS Cleantech Corporation's Surreply in Response to Defendants' (With the Exceptionof Adkins Energy) Joint Reply in Support of their Respective Motions for Summary Judgment of Noninfringement," filed in the United States District Court for the Southern District of Indiana Indianapolis Division, Case No. 1:10-ml-02181-LJM-DML, on Sep. 28, 2012; 26 pages.
GS Cleantech Corporation's, "GS Cleantech Corporation's Reply in Support of its Motion for Summary Judgment on Count 1 of Adkins Energy LLC's Counterclaims for Breach of Contract, (and Related Affirmative Defenses)," filed in the United States District Court for the Southern District of Indiana Indianapolis Division, Case No. 1:10-ml-02181-LJM-DML, on Apr. 8, 2013; 19 pages.
GS Cleantech Corporation's, "GS Cleantech Corporation's Memorandum of Law in Support of Motion for Summary Judgment of Infringement by Lincolnway Energy, LLC," filed in the United States District Court for the Southern District of Indiana Indianapolis Division, Case No. 1:10-ml-02181-LJM-DML, on Sep. 14, 2012; 26 pages including certificate of service.
GS Cleantech Corporation's, "GS Cleantech Corporation's Memorandum of Law in Support of Motion for Summary Judgment of Infringement by Blue Flint Ethanol, LLC," filed in the United States District Court for the Southern District of Indiana Indianapolis Division, Case No. 1:10-ml-02181-LJM-DML, on Sep. 14, 2012; 34 pages including certificate of service.
GS Cleantech Corporation's, "GS Cleantech Corporation's Memorandum of Law in Support of Motion for Summary Judgment of Infringement by Bushmills Ethanol, Inc.," filed in the United States District Court for the Southern District of Indiana Indianapolis Division, Case No. 1:10-ml-02181-LJM-DML, on Sep. 14, 2012; 27 pages including certificate of service.
GS Cleantech Corporation's, "GS Cleantech Corporation's Memorandum of Law in Support of Motion for Summary Judgment of Infringement by Cardinal Ethanol, LLC," filed in the United States District Court for the Southern District of Indiana Indianapolis Division, Case No. 1:10-ml-02181-LJM-DML, on Sep. 14, 2012; 29 pages including certificate of service.
GS Cleantech Corporation's, "GS Cleantech Corporation's Memorandum of Law in Support of Motion for Summary Judgment of Infringement by Chippewa Valley EthanoL Company, LLLP," filed in the United States District Court for the Southern District of Indiana Indianapolis Division, Case No. 1:10-ml-02181-LJM-DML, on Sep. 14, 2012; 32 pages including certificate of service.
GS Cleantech Corporation's, "Defendants' (With the Exception of Adkins Energy, LLC) Joint Memorandum of Law in Opposition to Plaintiff's Motions for Summary Judgement of Infringement," filed in the United States District Court for the Southern District of Indiana Indianapolis Division, Case No. 1:10-ml-02181-LJM-DML, on Nov. 19, 2012; 72 pages.
GS Cleantech Corporation's, "GS Cleantech Corporation's Memorandum of Law in Support of Motion for Summary Judgment of Infringement by Heartland Corn Products," filed in the United States District Court for the Southern District of Indiana Indianapolis Division, Case No. 1:10-ml-02181-LJM-DML, on Sep. 14, 2012; 40 pages including certificate of service.
GS Cleantech Corporation's, "GS Cleantech Corporation's Memorandum of Law in Support of Motion for Summary Judgment of Infringement by United Winsconsion Grain Producers, LLC," filed in the United States District Court for the Southern District of Indiana Indianapolis Division, Case No. 1:10-ml-02181-LJM-DML, on Sep. 14, 2012; 31 pages including certificate of service.
GS Cleantech Corporation's, "GS Cleantech Corporation's Memorandum of Law in Support of Motion for Summary Judgment of Infringement by Iroquois Bio-Energy Company, LLC," filed in the United States District Court for the Southern District of Indiana Indianapolis Division, Case No. 1:10-ml-02181-LJM-DML, on Sep. 14, 2012; 27 pages including certificate of service.
Matthews, H., Harrys Old Engine, De Laval Separator Company, A bit of history and development of DeLaval milers, 1995-2008, DeLaval Separator Company, 10 pages.
ICM, Inc., "Defendants ICM, Inc., David Vander Griend, Cardinal Ethanol, LLC, Big River Resources West Burlington, LLC, Big River Resources Galva, LLC, Lincolnland Agri-Energy, LLC Memorandum in Support of Motion for Their Motion for Summary Judgment of Non-Infringement," filed in the United States District Court for the Southern District of Indiana Indianapolis Division, Case No. 1:10-ml-02181-LJM-DML, on May 23, 2012; 26 pages including certificate of service.
Iroquois Bio-Energy Company, LLC, "Iroquois Bio-Energy Company, LLC's Supplemental memorandum in Opposition to Plaintiff's Motion for Summary Judgment of Infringement," filed in the United States District Court for the Southern District of Indiana Indianapolis Division, Case No. 1:10-ml-02181-LJM-DML, on Nov. 15, 2012; 6 pages including certificate of service.
GS Cleantech Corporation's, "Defendant Iroquois Bio-Energy Company, LLC's Memorandum in Support of Motion for Summary Judgment of Non-Infringement," filed in the United States District Court for the Southern District of Indiana Indianapolis Division, Case No. 1:10-ml-02181-LJM-DML, on Jun. 4, 2012; 28 pages including certificate of service.
Lincolnway Energy, LLC., Defendants, "Memorandum in Support of Defendants Lincolnway Energy, LLC, Lincolnland Agri-Energy, LLC, et al., Joint Motion for Summary Judgment of Invalidity and Noninfringement of U.S. Pat. No. 8,168,037 and in Opposition to Plaintiff's Motion for Summary Judgment of Infringement ", filed

(56) References Cited

OTHER PUBLICATIONS in the United States District Court for the Southern District of Indiana Indianapolis Division, Case No. 1:10-ml-02181-LJM-DML, on Dec. 31, 2013; 48 pages.
"Memoradum in Opposition to Adkins Energy LLC's Motion for Judgment on the Pleadings or in the Alternative for Partial Summary Judgment on the Issue of Liability for Breach of Contract, and for Partial Summary Judgment on One Part of Adkins' Damages," filed in the United States District Court for the Southern District of Indiana Indianapolis Division, Case No. 1:10-ml-02181-LJM-DML, on Mar. 24, 2011; 10 pages including certificate of service.
"Reply Memorandum in Support of Adkins Energy LLC's Motion for Judgment on the Pleadings or in the Alternative for Partial Summary Judgment on the Issue of Liability for Breach of Contract, and for Partial Summary Judgment on One Part of Adkin's Damages" filed in the United States District Court for the Southern District of Indiana Indianapolis Division, Case No. 1:10-ml-02181-LJM-DML, on Apr. 7, 2011; 12 pages.
"Memorandum in Support of Adkins Energy LLC's Motion for Judgment on the Pleadings or in the Alternative for Partial Summary Judgment on the Issue of Liability for Breach of Contract, and for Partial Summary Judgment on One Part of Adkins' Damages," filed in the United States District Court for the Southern District of Indiana Indianapolis Division, Case No. 1:10-ml-02181-LJM-DML, on Feb. 24, 2011; 12 pages including certificate of service.
Abstract of JP54064683A; published May 24, 1979, 1 page.
Blue Flint Ethanol LLC regarding U.S. Pat. No. 8,168,037; filed in the United States District Court for the Southern District of Indiana; Indianapolis Division; Preliminary Invalidity Contentions; In Re: Method of Processing Ethanol Byproducts and Related Subsystems ('858) Patent Litigation; Master Case. No. 1:10-ml-02181-LJM-DML; Associated Case No. 1:10-CV-08001-LJM-DML; dated Dec. 24, 2012; 39 pages.
Bushmills Ethanol, Inc., Chippewa Valley Ethanol Company, LLLP, Heartland Corn Products and United Wisconsin Grain Producers LLC, Preliminary Invalidity Contentions; filed in the United States District Court; Southern District of Indiana; Indianapolis Division; In Re: Method of Processing Ethanol Byproducts and Related Subsystems (858) Patent Litigation; Master Case No. 1:10-ml-02181-LJM-DML; dated Jan. 24, 2011; 23 pages.
Flottweg Separation Technology, Inc.'s Preliminary Invalidity Contentions; In Re: Method of Processing Ethanol Byproducts and Related Subsystems ('858') Patent Litigation; Master Case No. 1:10-MLO-02181-LJM-DML; Associated Case No. 1:10-cv-8010-LJM-DML; dated Jan. 24, 2011; 12 pages.
GEA Westfalia Separator, Inc. and Ace Ethanol LLC.'s Preliminary Invalidity Contentions, filed in The United States District Court for the Southern District of Indiana; Indianapolis Division; In Re: Method of Processing Ethanol Byproducts and Related Subsystems ('858) Patent Litigation; 1:10-ml-02181-LJM-DML; filed Jan. 24, 2011: 28 pages.
*GS Cleantech Corporation v. GEA Westfalia Separator, Inc.; Ace Ethanol, LLC; ICM, Inc.; Lifeline Foods LLC*; and Does 1-30, Inclusive, First Amended Complaint for Patent Infringement; Civil Action No. 09-cv-08642-SAS, filed Oct. 23, 2009, pp. 1-11.
Matthews, H., Harrys Old Engine, De Laval Separator Compnay, A bit of history and development of DeLaval milers, 1995-2008, DeLaval Separator Company, 10 pages.
Lincolnway Energy, LLC; Preliminary Invalidity Contentions filed in the United States District Court, Southern District of Indiana; Indianapolis Division; In re: Method for Processing Ethanol Byproducts and Related Subsystems ('858) Patent Litigation; Master Docket: 1:10-ml-02181-LJM-DML; dated Jan. 24, 2011; 19 pages.
Lincolnway Energy LLC Preliminary Invalidity Contentions; filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; Associated Case No. 5:10-cv-4036; filed Oct. 15, 2012, 24 pages total; Exhibit A, pp. 3 pages and Exhibit B, 4 pages, ( pp. 275-278).

Notice of Allowance for U.S. Appl. No. 12/559,136, filed Sep. 14, 2009; First Named Inventor: David Fred Cantrell; Mailing Date: Jan. 21, 2011.
Notice of Allowance for U.S. Appl. No. 12/559,136, filed Sep. 14, 2009; First Named Inventor: David Fred Cantrell; Mailing Date: Jun. 24, 2011.
Notice of Allowance for U.S. Appl. No. 11/241,231, filed Sep. 30, 2005; Inventor: David Fred Cantrell; Mailing Date: Jul. 22, 2011; 9 pages.
Notice of Allowance for U.S. Appl. No. 11/241,231, filed Sep. 30, 2005; First Named Inventor: David Fred Cantrell; Mail Date: Aug. 11, 2010; 8 pgs.
Office Action issued in Canadian Patent Application No. 2,576,895, Owner: GS Ethanol Technologies, Inc; Title: Method of Processing Ethanol ByProducts and Related Subsystems; dated Oct. 18, 2012; 3 pages.
Office Action—Final; U.S. Appl. No. 11/856,150, filed Sep. 19, 2012; First Named Inventor: David J. Winsness; Mail Date: Feb. 22, 2010; 11 pgs.
Office Action—Final for U.S. Appl. No. 11/908,891, filed Sep. 17, 2007; First Named Inventor: David J. Winsness; Mailing Date: Mar. 21, 2012.
Office Action—Final issued in U.S. Appl. No. 11/908,891 dated May 9, 2013; 25 pages.
Office Action—Final for U.S. Appl. No. 11/908,891, filed Sep. 17, 2007; First Named Inventor: David J. Winsness; Mailing Date: Nov. 23, 2011.
Office Action—Final; U.S. Appl. No. 11/122,859, filed May 5, 2005; First Named Inventor: David Fred Cantrell; Mail Date: Dec. 22, 2008; 9 pgs.
Office Action—Non-Final for U.S. Appl. No. 11/908,891, filed Sep. 17, 2007; First Named Inventor: David J. Winsness; Mail Date: Jan. 21, 2010; 14 pgs.
Office Action—Non-Final for U.S. Appl. No. 13/450,997, filed Apr. 19, 2012; First Named Inventor: David Fred Cantrell; mailed Feb. 21, 2013; 27 pgs.
Office Action—Non-Final for U.S. Appl. No. 11/122,859, filed May 5, 2005; First Named Inventor: David Fred Cantrell; Mail Date: Jun. 13, 2008; 15 pgs.
Author Unknown, "Disc Stack Centrifuge" Alfa Laval website, www.alfalaval.com Aug. 3, 2004.
Alfa Laval, "NS 934 DD Decanter", PFT00017EN 0207, PFT00018EN 0207, PFT0007EN 0207, 6 pgs.
Bizimana, V., et al. "Avocado Oil Extraction with Appropriate Technology for Developing Countries" (JAOCS, vol. 70, No. 8 (Aug. 1993); pp. 821-822.
Castellanos, et al. Abstract of "Extraction of Oil from Fresh Coconut"; Oleagineux 24 (7): 419-21-24 (8/9) 505-09, 1969; 1 page.
Committee on Animal Nutrition, Board on Agriculture and Renewable Resources; Commission on Natural Resources; National Research Counsel "Feeding Value of Ethanol Production By-products"; National Academy Press, Washington, D.C. 1981; 80 pages.
Davis, Kelly S., "Corn Milling, Processing and Generation of Co-Products", Nutrition Conference—Minnesota Corn Growers Association, Technical Symposium, Sep. 11, 2001; 7 pgs.
Dominguez, H., et al. "Enzymatic pretreatment to enhance oil extraction from fruits and oilseeds: a review", Food Chemistry 49 (1994), pp. 271-286.
Food and Agriculture Organization of the United Nations / FAO, Fishery Industries Division, "The Production of Fish Meal and Oil"; FAO Fish. Tech. Pap (142) Rev. 1; (1986); 80 pgs.
Gupta, R., et al., "A Novel Approach to Process Crude Oil Membrane Concentrate Using a Centrifuge", Journal of the American Oil Chemists' Society, vol. 79, No. 5, (2002); pp. 419-423.
Hagenmeier et al. "Aqueous Processing of Fresh Coconuts for Recovery of Oil and Coconut Skim Milk" Journal of Food Science, vol. 38, 1973, pp. 516-518.
S.S. Koseoglu et al., "Aqueous, Membrane and Adsorptive Separations of Vegetable Proteins", Good Protein Research and Development Center, Texas Engineering Experiment Station, Texas A&M University System, 1989, pp. 528-547.

(56) References Cited

OTHER PUBLICATIONS

Lehmann, Hanno-R., et al. "Whey Processing Lines" Westfalia Separator AG, Technical Scientific Documentation No. 6, 3rd Rev. Ed., 1988, 6 pgs.
McAloon et al., "Determining the Cost of Producing Ethanol from Corn Starch and Lignocellulosic Feedstocks", Ntional Renewable Energy Laboratory, NL/TP-580-28893, Oct. 2000; 43 pgs.
McIntyre, Craig., "Measurement solutions for Ethanol Producers", A white paper by Endress+Hauser, Inc., Copyright 2003, pp. 1-10.
PRX The ProExporter Network "PRX Digest Grain Database" m constantly updated, 1 pg.
Puertollano, et al., "Separation of the Oil and Protein Fractions in Coconut", J. Agr. Food Chem., vol. 18, No. 4, 1970, pp. 579-685.
Rosenthal et al., "Aqueous and enzymatic processes for edible oil extraction", Enzyme Microb. Technol., vol. 19, Nov. 1, 1996, pp. 402-420.
Stanton, W.R., "Fermentation Assisted Byproduct Recovery in the Palm Oil Industry", Agricultural Wastes 6, (1983), pp. 31-63.
Sweeten et al., "Removal and Utilization of Ethanol Stillage Constituents" Energy in Agriculture, 1 (1981-1983), Elsevier Science Publishers B.V.; pp. 331-345.
Tjardes, Kent et al., "Feeding Corn Distiller's Co-Products to Beef Cattle", Cooperative Extension Services, Extension Extra, ExEx 2036, Animal & Range Sciences, College of Agriculture & Biological Sciences / South Dakota State University / USDA, Aug. 2002, 5 pgs.
Westfalia Separator Industry "Decanters and Separators for Industrial Fish Processing", 1999, 36 pages.
Westfalia Separator AG / Communication Westfalia Magazine, Edition No. 3, International, "The Latest on Industrial Fish Processing" 1979, 103 pgs.
Dote, Y., et al. "Liquefaction of Stillage from Ethanolic Fermentation and Upgrading of Liquefied Oil" Trans. Mat. Res. Soc. Jpn, vol. 18A, 1994, pp. 285-288.
Final Office Action; U.S. Appl. No. 11/856,150, filed Sep. 17, 2007; First Named Inventor: David J. Winsness; Mail Date: Feb. 22, 2010.
Final Office Action, U.S. Appl. No. 11/122,859, filed May 5, 2005; First Named Inventor: David Fred Cantrell; Mail Date: Dec. 22, 2008.
*GS Cleantech Corporation v. GEA Westfalia Separator, Inc.; and Does 1-20*, Inclusive; Complaint, Case No. 1:09-cv-08642-LMM; filed Oct. 13, 2009, pp. 1-8.
*GS Cleantech Corporation*, Plaintiff v. *Big River Resources Galva, LLC and Big River Resources West Burlington, LLC*, Defendants; "Complaint"; filed in the United States District Court for the Northern District of Illinois, Eastern Division, on Feb. 12, 2010, Document 1; Case 1:10-cv-0090; 9 pgs.
*GS Cleantech Corporation*, Plaintiff, v. *Big River Resources Galva, LLC and Big River Resources West Burlington, LLC*, Defendants; "Motion for Preliminary Injunction"; filed in the United States District Court for the Northern District of Illinois, Eastern Division, Case No. 10-990, on Feb. 15, 2010, Document 6; Case 1:10-cv-0090, 2 pgs.
*GS Cleantech Corporation*, Plaintiff, v. *Big River Resources Galva, LLC and Big River Resources West Burlington, LLC*, Defendants, "Plaintiff's Memorandum of Law in Support of Its Motion for Preliminary Injunction" (with Exhibits 8, 8-1 through 8-8 inclusive), filed in the United States District Court for the Northern District of Illinois Easter Division, Case No. 10-990, on Feb. 15, 2010, Document 7, Case 1:10-cv-0090, 401 pgs.
*GS Cleantech Corporation*, Plaintiff, v. *Cardinal Ethanol, LLC*, Defendant, "Complaint for Patent Infringement", filed in United State District Court for the Southern District of Indianapolis Division, Civil Action No. 1:10-cv-0180LJM-DML; on Feb. 10, 2010; Document 1; Case No. 1:10-cv-00180-LJM-DML, 9 pgs.
*GS Cleantech Corporation*, Plaintiff, v. *Cardinal Ethanol, LLC*, Defendant, "Motion for Preliminary Injunction"; filed in United State District Court for the Southern District of Indiana, Indianapolis Division, Civil Action No. 1:10-cv-0180-LJM-DML, on Feb. 10, 2010, Document 7, Case No. 1:10-cv-00180-LJM-DML, 2 pgs.
*GS Cleantech Corporation*, Plaintiff, v. *Cardinal Ethanol, LLC, Defendant*; "Plaintiff's Reply Brief in Support of Its Motion for Preliminary Injunction" (with Exhibits 32 and 32-1); filed in United States District Court for the Southern District of Indiana, Indianapolis Division, Civil Action No. 1:10-cv-0180-LJM-DML, on Apr. 5, 2010; Document 31, Case 1:10-cv-0180-LJM-DML, 25 pgs.
*GS Cleantech Corporation*, Plaintiff v. *Cardinal Ethanol, LLC*, Defendant; "Plaintiff's Memorandum of Law in Support of its Motion for Preliminary Injunction" (with Exhibits 9-1 through 9-15 inclusive), filed in United States District Court Southern District of Indiana, Indianapolis Division, Civil Action No. 1:10-cv-0180LJM-DML, on Feb. 11, 2010, Document 9, Case No. 1:10-cv-00180-LJM-DML, 456 pgs.
*GS Cleantech Corporation*, Plaintiff, v. *Cardinal Ethanol, LLC*, Defendant, "Defendant's Memorandum of Law in Opposition to Plaintiff's Motion for Preliminary Injunction" (with Exhibits 26-1 through 26-24 inclusive), Civil Action No. 1:10-cv-0180 LJM-DML; filed in United States District Court Southern District of Indiana Indianapolis Division, on Mar. 24, 2010, Document 26, Case 1:10-cv-00180-LJM-DML, 306 pgs.
*GS Cleantech Corporation*, Plaintiff, v. *GEA Westfalia Separator, Inc.; Ace Ethanol, LLC; ICM, Inc.; Lifeline Foods LLC; and Does 1-30*, Inclusive, Defendants, "GEA Westfalia Separator, Inc.'s Answer to Plaintiff's First Amended Complaint for Patent Infringement", filed in United States District Court for the Southern District of New York, Civil Action No. 09-cv-08642-LMM; on Nov. 18, 2009, Document 21, Case 1:09-cv-08642-LMM, 9 pgs.
*GS Cleantech Corporation*, Plaintiff v. *Gea Westfalia Separator, Inc.; Ace Ethanol, LLC; ICM, Inc.; Lifeline Foods LLC; and Does 1-30*, Inclusive, Defendant; "First Amended Complaint for Patent Infringement"; filed United States District Court for the Southern District of New York, Civil Action No. 09-cv-08642-SAS, on Oct. 15, 2009, Document 3-2; Case 1:09-cv-08642-LMM, 11 pgs.
*GS Cleantech Corporation*, Plaintiff, v. *GEA Westfalia Separator, Inc.; Ace Ethanol, LLC; ICM, Inc.; Lifeline Foods LLC; and Does 1-30*, Inclusive, Defendants; "Ace Ethanol, LLC's Answer to Plaintiff's First Amended Complaint for Patent Infringement" filed in United States District Court for the Southern District of New York; Civil Action No. 09-cv-08642-LMM, filed on Nov. 18, 2009, Document 19; Case 1:09-cv-08642-LMM, 9 pgs.
*ICM, Inc. v. GS Cleantech Corporation Greenshift Corporation*, Complaint for Declaratory Judgement, Civil Action No. 09-1315-WEB-KMH, filed Oct. 13, 2009, pp. 1-6.
Jacques et al. "The Alcohol Textbook" 3rd Edition, published 1999, Part 1 of 4 Parts, 53 pgs.
Jacques, et al., "The Alcohol Textbook", 3rd Edition, published 1999, Part 2 of 4 Parts, 50 pgs.
Jacques, et al., "The Alcohol Textbook", 3rd Edition, published 1999, Part 3 of 4 Parts, 50 pgs.
Jacques, et al., "The Alcohol Textbook", 3rd Edition, published 1999, Part 4 of 4 Parts, 42 pgs.
Minowa, T., et al. "Oil Production from Buckwheat Stillage by Thermochemical Liquefaction)" National Inst. for Resources and Environment Ibaraki (Japan), STN, Abstract, NTIS database, 1999.
Non-Final Office Action, U.S. Appl. No. 11/908,891, filed Sep. 17, 2007; First Named Inventor: David J. Winsness; Mail Date: Jan. 21, 2010.
Non-Final Office Action; U.S. Appl. No. 11/122,859, filed May 5, 2005; First Named Inventor: David Fred Cantrell; Mail Date: Jun. 13, 2008.
Non-Final Office Action; U.S. Appl. No. 11/688,425, filed Mar. 20, 2007; First Named Inventor: David J. Winsness; Mail Date: Aug. 1, 2008.
Exhibit 22, Transmittal Letter filed in U.S. Appl. No. 11/122,859, dated Jun. 5, 2009, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on Feb. 2, 2015; 4 pages, Document No. 1427-10.
Exhibit 4, Email from David Cantrell to Jay Sommers, Mark Lauderbaugh; AA-David Winsness and Gerald Winter re: VDT Ethanol Oil Recovery System, dated Aug. 1, 2003, filed in the United States District Court, Southern District of Indiana, India-

(56) References Cited

OTHER PUBLICATIONS napolis, Division, in re: Method of Processing Ethanol Byproducts and Related Subsystems ('858) Patent Litigation; Master Case. No. 1:10-ml-02181-LJM-DML; filed on Feb. 2, 2015; 5 pages, Document No. 1427.

Exhibit 8, Email from David Cantrell to Gerald Winter and Jay Sommers re: VDS System Update, dated Jun. 5, 2003, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on Feb. 2, 2015; 4 pages, Document No. 1427-1.

Exhibit 9, Email from David Cantrell to Gerald Winter and Jay Sommers re: Oil Recovery, dated Jun. 29, 2003, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on Feb. 2, 2015; 2 pages, Document No. 1427-2.

Exhibit 11, Email from David Cantrell to Mike Stanley and Jay Sommers re: Oil Recovery, dated Aug. 18, 2003, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on Feb. 2, 2015; 5 pages, Document No. 1427-3.

Exhibit 12, Schematics (Drawings); filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on Feb. 2, 2015; 4 pages, Document No. 1427-4.

Exhibit 21, Supplemental Response filed in U.S. Appl. No. 11/241,231, dated Nov. 9, 2010 (with attachments), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on Feb. 2, 2015; 13 pages, Document No. 1427-9.

Exhibit 14, Article entitled "Greenshift Receives Notices of Allowance on Three New Corn Oil Extraction Patents," dated Jan. 21, 2015 (www.greenshift.com/news/item/14), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on Feb. 2, 2015; 3 pages, Document No. 1427-5.

Exhibit 18, Letter from David Cantrell to Jay Sommers and Gerald Winters dated Jul. 31, 2003, re: VDT Oil Recovery Unit, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on Feb. 2, 2015; 4 pages, Document No. 1427-6.

Exhibit 19, Chain Email, pp. 24-34, from David Winsness to Ed Pearce, Rod Lee, Frank Polifka and David Cantrell, re: Ethanol Provisional Patent Application dated Sep. 2, 2004, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on Feb. 2, 2015; 10 pages, Document No. 1427-7.

GS Cleantech Corporation's Motion to Submit a Surreply in Response to Defendants' Reply in Support of Their Motion to Compel Discovery of Specific Attorney Client Communications, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on Feb. 12, 2015; 3 pages (including Certificate of Service), Document No. 1430.

Cleantech's Surreply to Defendants' Reply in Support of Their Motion to Compel Discovery of Specific Attorney Client Communications, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on Feb. 2, 2015; 6 pages (including Certificate of Service), Document No. 1431.

Transcript of Status Conference held Feb. 17, 2015 and dated Feb. 25, 2015, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; 35 pages, Document No. 1434.

Joint Stipulated Consent and Motion to Transfer Venue of Actions to the Southern District of Indiana, dated Mar. 4, 2015, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on Mar. 4, 2015; 6 pages (including Certificate of Service), Document No. 1439.

Stipulated Order Dismissing GEA/ACE Ethanol's Lanham Act Claim, dated Mar. 4, 2015, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on Mar. 4, 2015, 4 pages, Document No. 1436.

Adkins Energy LLC's Motion to Sever and for a Suggestion of Remand, dated Mar. 4, 2015, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on Mar. 4, 2015; 3 pages (including Certificate of Service), Document No. 459.

Adkins Energy LLC's memorandum in Support of Its Motion to Sever and for a Suggestion of Remand, dated Mar. 4, 2015, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on Mar. 4, 2015; 6 pages (including Certificate of Service), Document No. 1438.

Joint Statement Regarding Discovery, dated Mar. 12, 2015, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on Mar. 12, 2015; 3 pages, Document No. 1446.

Exhibit A, Defendants' Second Set of Requests for Production of Documents and Things to Plaintiff, GS Cleantech Corporation, dated Feb. 26, 2015, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on Mar. 12, 2015; 14 pages (including Certificate of Service), Document No. 1446-1.

Exhibit B, Notice of Rule 30(b)(6) Deposition to GS Cleantech Corporation, dated Feb. 26, 2015, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on Mar. 12, 2015; 9 pages (including Certificate of Service), Document No. 1446-2.

Order Granting Partial Summary Judgment Based on Oct. 23, 2014 Order and Mar. 11, 2015 Stipulation, Ordered Mar. 24, 2015, in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on Mar. 24, 2015; 3 pages, Document No. 1448.

Order on Motion for Clarification of Scheduling Order, in the United States District Court, Southern District of Indiana, Indianapolis, Division, in re: Method of Processing Ethanol Byproducts

(56) References Cited

OTHER PUBLICATIONS and Related Subsystems ('858) Patent Litigation; Master Case. No. 1:10-ml-02181-LJM-DML; Ordered on Apr. 14, 2015; 2 pages, Document No. 1458.

Defendants Request for Clarification of Apr. 7, 2015, Revised Scheduling Order, in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on Apr. 9, 2015; 7 pages (including Certificate of Service), Document No. 1455.

Order on Defendant Adkins Energy LLC's Renewed Motion for Limited Remand, in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; Ordered on Apr. 7, 2015; 4 pages, Document No. 1453.

Reply in Support of Motion for Reconsideration Regarding Discovery Dispute Relating to Plaintiff's Financial Information dated Apr. 20, 2015, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on Apr. 20, 2015; 5 pages (including Certificate of Service), Document No. 1460.

Adkins Energy LLC's Motion for Suggestion of Remand Now That Pretrial Proceedings Have Concluded dated May 5, 2015, in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on May 5, 2015; 2 pages (including Certificate of Service), Document No. 1461.

Memorandum in Support of Adkins Energy LLC's Motion for Suggestion of Remand Now That Pretrial Proceedings Have Concluded dated May 5, 2015, in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on May 5, 2015; 7 pages (including Certificate of Service), Document No. 1462.

Cleantech's Response to the Order on the Motion to Seal in Connection With Motion to Compel Attorney-Client Communications dated May 15, 2015, in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on May 15, 2015; 6 pages (including Certificate of Service), Document No. 1466.

Cleantech's Response to the Order on the Motion to Seal Documents Related to Financial Discovery Issue, dated May 15, 2015, in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on May 15, 2015; 2 pages (including Certificate of Service), Document No. 1467.

Order on Motion to Compel Discovery of Attorney-Client Communications, in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; Ordered on May 15, 20155; 10 pages (including Certificate of Service), Document No. 1468.

Reply of Adkins Energy, LLC in Support of its Motion for Suggestion of Remand, dated May 28, 2015, in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on May 28, 2015; 4 pages (including Certificate of Service), Document No. 1476.

Letter from Michael F. Buchanan to Honorable Larry J. McKinney dated May 28, 2015, in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on May 28, 2015; 2 pages, Document No. 1478.

Plaintiff GS Cleantech Corporation's Opposition to Adkins Energy, LLC's Motion for a Suggestion of Remand, dated May 22, 2015, in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on May 22, 2015; 3 pages (including Certificate of Service), Document No. 1472.

Cleantech's Opposition to Defendant's Motion to Compel Discovery of Specific Attorney-Client Communications Relating to Intent to Decieve the PTO and Withheld by Cleantech Under Claim of Privilege, dated Jun. 4, 2015, in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed on Jun. 4, 2015; 37 pages (including Certificate of Service), Document No. 1481.

GS Cleantech's Reply to Defendants Response in Opposition to GS Cleantech's Motion to File a Surreply to Iroquois Bio-Engergy Comany LLC's Reply in Support of its Motion to Compel Deposition of Chad Dever and Michael Rye, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 14, 2014; 4 pages, Document No. 1385.

Iroquois Bio-Energy Company, LLC's Preliminary Invalidity Contentions, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 24, 2014; 26 pages, Document No. 1387-2.

Designation of Evidence to Cleantech's Opposition to Defendants' Motion to Compel Deposition and Document Production Regarding Andrew Dorisio, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 24, 2014; 3 pages, Document No. 1387.

Email from Spiro Bereveskos to Michael J. Rye dated Aug. 6, 2014 (Exhibit 1), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Nov. 24, 2014; 19 pages, Document No. 1387-1.

File History of U.S. Pat. No. 7,601,858 (Exhibit 50), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 14 pages, Document No. 1396-30.

File History of U.S. Pat. No. 7,601,858 (Exhibit 51), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 6 pages, Document No. 1396-31.

File History of U.S. Pat. No. 7,601,858 (Exhibit 46), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 14 pages, Document No. 1396-27.

File History of U.S. Pat. No. 7,601,858 (Exhibit 49), filed in the United States District Court, Southern District of Indiana, Indianapolis, Division, in re: Method of Processing Ethanol Byproducts

(56) References Cited

OTHER PUBLICATIONS and Related Subsystems ('858) Patent Litigation; Master Case. No. 1:10-ml-02181-LJM-DML; dated Dec. 23, 2014; 14 pages, Document No. 1396-29.

File History of U.S. Pat. No. 8,283,484 (Exhibit 48), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 5 pages, Document No. 1396-28.

Letter from David Cantrell to Agri-Energy (Mr. Jay Sommers) dated Jul. 31, 2003 (Exhibit 45), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 4 pages, Document No. 1396-26.

Plaintiff's Updated Privilege Log (Exhibit 40), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 73 pages, Document No. 1396-23.

Letter from Chad A. Dever, Esq. to Spiro Bereveskos dated Aug. 11, 2014 (Exhibit 41), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 6 pages, Document No. 1396-24.

Documents Requested From Cleantech Privilege Log (Exhibit 44), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 6 pages, Document No. 1396-25.

Exhibit 38, United States Publication No. 2004/0087808 A1, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 12 pages, Document No. 1396-21.

File History of U.S. Pat. No. 7,601,858 (Exhibit 39), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 11 pages, Document No. 1396-20.

Exhibit 37, U.S. Pat. No. 7,601,858 B2, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 11 pages, Document No. 1396-20.

Exhibit 30, Email from KGleason to John Weyrauch (chain email) dated Oct. 28, 2011, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 35 pages, Document No. 1396-19.

Exhibit 26, Letter from David Cantrell to Agri-Energy, re: VDS Oil Recovery System dated Jul. 11, 2003, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 5 pages, Document No. 1396-17.

Exhibit 28, Letter from David Cantrell to David Vander Griend (ICM, Inc), dated Jul. 7, 2005, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 2 pages, Document No. 1396-18.

Exhibit 22, Email from Doug Corey to Philip Schoof, dated Dec. 1, 2009, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 5 pages, Document No. 1396-14.

Exhibit 24, Letter from David Cantrell to Jay Sommers (Agri-Energy), re: VDT Oil Recovery Unit, dated Jul. 31, 2003, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 4 pages, Document No. 1396-15.

Exhibit 25, Letter from David Cantrell to Jay Sommers (Agri-Energy), re: VDT Oil Recovery Unit, dated Aug. 19, 2003, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 5 pages, Document No. 1396-16.

Exhibit 21, Email from David Cantrell to Mike Stanley, re: Oil Recovery dated Aug. 18, 2003, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 5 pages, Document No. 1396-13.

Exhibit 19, Letter from David Cantrell to Mr. Jay Sommers (Agri-Energy, LLC), re: VDT Oil Recovery System dated Aug. 19, 2003, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 4 pages, Document No. 1396-12.

Exhibit 18, Letter from David Cantrell to Mr. Jay Sommers (Agri-Energy, LLC), re: VDT Oil Recovery System dated Jul. 31, 2003, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 3 pages, Document No. 1396-11.

Exhibit 17, Email from David Cantrell to Ed Pearce; Rod Lee, AA-Keith Rinehart; AA-David Winsness, re: List of Ethanol Production Facilities dated Aug. 27, 2003, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 6 pages, Document No. 1396-10.

Exhibit 13, Email from David Cantrell to Jay Sommers; Mark Lauderbaugh; AA-David Winsness; Gerald Winter, re: VDT Ethanol Oil Recovery System dated Aug. 1, 2003, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 5 pages, Document No. 1396-8.

Exhibit 14, Declaration of David Cantrell for U.S. Appl. No. 13/107,197 dated Jul. 10, 2012 with attachments, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 7 pages, Document No. 1396-9.

Exhibit 9, Supplemental Response filed in U.S. Appl. No. 11/241,231 dated Nov. 9, 2010 with attachments, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 13 pages, Document No. 1396-5.

(56) References Cited

OTHER PUBLICATIONS

Exhibit 10, Publication entitled GreenShift Receives New Corn Oil Extraction Patent dated Jul. 20, 2011, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 5 pages, Document No. 1396-6.

Exhibit 12, File History of U.S. Pat. No. 8,283,484, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 11 pages, Document No. 1396-20.

Exhibit 5, Letter filed by Cantor Colburn in U.S. Appl. No. 13/107,197 dated Jul. 21, 2011, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 5 pages, Document No. 1396-4.

Exhibit 3, Cover Page of File History of U.S. Pat. No. 8,008,516 with attachment, filed in the United States District Court, Southern District of Indiana, Indianapolis, Division, in re: Method of Processing Ethanol Byproducts and Related Subsystems ('858) Patent Litigation; Master Case. No. 1:10-m1-02181-LJM-DML; dated Dec. 23, 2014; 5 pages, Document No. 1396-2.

Exhibit 4, Cover Page of File History of U.S. Pat. No. 8,008,517 with attachment, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 5 pages, Document No. 1396-3.

Exhibit 1, Cumulative Supplement Article, written by John William Gergacs dated Aug. 2010, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 7 pages, Document No. 1396.

Exhibit 2, Letter filed by Cantor Colburn in U.S. Appl. No. 11/122,859 dated Jun. 5, 2009, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 4 pages, Document No. 1396-1.

Defendants' Motion to Compel Discovery of Specific Attorney-Client Communications Relating to Intent to Decieve the PTO and Withheld by Cleantech Under a Claim of Privilege, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 3 pages, Document No. 1394.

Tag-Along Defendants Aemetis Advanced Fuels Keyes, Inc. et al., Unopposed Motion for Extension of the Jan. 9, 2015 Deadline for Tag-Along Defendants to File Summary Judgment Motion of Infringement dated Dec. 23, 2014, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 23, 2014; 7 pages (including Certificate of Service), Document No. 1393.

Order by Judge Debra McVicker Lynch dated Dec. 8, 2014, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 1, 2014; 2 pages, Document No. 1392.

Motion to File Under Seal, filed by Counsel for Bushmills Ethanol, Inc., et al., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 1, 2014; 3 pages, Document No. 1391.

Plaintiff's Motion for Extension of Time to Submit a Response in Opposition to Defendants' Motion to Compel Discovery of Specific Attorney-Client Communications Relating to Intent to Deceive the PTO and Withheld by Cleantech Under a Claim of Privilege (with Consent), filed in the U.S.D.C., Southern District of Indiana, Indianapolis, Division, in re: Method of Processing Ethanol Byproducts and Related Subsystems ('858) Patent Litigation; Master Case. No. 1:10-ml-02181-LJM-DML; dated Dec. 30, 2014; 5 pages, Document No. 1399.

Order on Motion to Compel Depositions of Dever and Rye, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 13, 2015; 5 pages, Document No. 1403.

Motion for Partial Relief from Scheduling Order, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 14, 2015; 2 pages, Document No. 1406.

Plaintiff's GS Cleantech and Defendants Aemetis Advanced Fuels Keyes, Inc. et al., Stipulation for Entry of Judgment filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 14, 2015; 7 pages including Certificate of Service, Document No. 1407.

Order on Motion to Compel Deposition and Document Production of Attorney Dorisio, dated Jan. 15, 2015, filed in The United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 15, 2015; 2 pages, Document No. 1408.

Order Granting Partial Summary Judgment Based on Oct. 23, 2014 Order and Jan. 14, 2015 Stipulation dated Jan. 16, 2015, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 16, 2015; 3 pages, Document No. 1412.

Defendants' Response to Plaintiff's Motion for Partial Relief from Scheduling Order dated Jan. 21, 2015, filed in The United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 21, 2015; 3 pages, Document No. 1420.

Cleantech's Opposition to Defendants' Motion to Compel Discovery of Specific Attorney-Client Communications Relating to Intent to Decieve the PTO and Withheld by Cleantech Under a Claim of Privilege, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 23, 2015; 38 pages, Document No. 1423.

Declaration of Michele C. Perino, Esq. in Support of Cleantech's Opposition to Defendants' Motion to Compel Discovery of Specific Attorney-Client Communications Relating to Intent to Decieve the PTO and Withheld by Cleantech Under a Claim of Privilege, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jan. 23, 2015; 9 pages, Document No. 1424.

Exhibit 20, Email from David Cantrell to Ed Pearce; Rod Lee; AA-Keith Rinehart; AA-David Winsness, re: List of Ethanol Production Facilities (with attachment) dated Jul. 31, 2003, filed in the United States District Court, Southern District of Indiana, India-

(56) References Cited

OTHER PUBLICATIONS napolis, Division, in re: Method of Processing Ethanol Byproducts and Related Subsystems ('858) Patent Litigation; Master Case. No. 1:10-ml-02181-LJM-DML; filed Feb. 2, 2015; 6 pages, Document No. 1427-8.

Cleantech's Opposition to Defendants' Motion to Compel Discovery of Specific Attorney-Client Communications Relating to Intent to Decieve the PTO and Withheld by Cleantech Under a Claim of Privilege, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 4, 2015; 37 pages including Certificate of Service, Document No. 1481.

Exhibit 3: History of U.S. Appl. No. 11/122,859, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Jun. 9, 2015; 242 pages, Document No. 1485.

Exhibit 11: Declaration and Application Parts of U.S. Appl. No. 11/688,425, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Jun. 9, 2015; 13 pages, Document No. 1485-1.

Declaration of Binni N. Shah in Support of Cleantech's Response to Defendants' Corrected Supplemental Brief Re: Motion to compel Discovery of Specific Attorney-Client Communications Relating to Intent to Deceive the PTO and Withheld by Cleantech Under a Claim of Privilege and Certain Exhibits Under Seal, filed in the U.S.D.C., Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 16, 2015; 3pgs. pages. Doc #1492.

Motion for Leave to File a Surreply to Plaintiffs Supplemental Brief Re: Motion to Compel Discovery of Specific Attorney-Client Communications Relating to Intent to Deceive the PTO and Withheld by Cleantech Under a Claim of Privilege, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 18, 2015; 3 pages including Certificate of Service, Document No. 1496.

Exhibit 2: Defendants' First Set of Requests for Production of Documents and Things to Plaintiff, GS Cleantech Corporation, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Jun. 18, 2015; 29 pages, Document No. 1499.

Unopposed Motion for Continuance, filed in the United States District Court, Southern District of Indiana, Indianapolis, Division, in re: Method of Processing Ethanol Byproducts and Related Subsystems ('858) Patent Litigation; Master Case. no. 1:10-ml-02181-LJM-DML; dated Jun. 18, 2015; 2 pages including Certificate of Service, Document No. 1500.

Proposed Scheduling Order, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 18, 2015; 1 page, Document No. 1501.

GS Cleantech Corporation's Motion to Submit a Response to Defendants' Surreply, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 26, 2015; 3 pages including Certificate of Service, Document No. 1507.

Motion to Attend Jul. 8, 2015 Hearing Via Telephone by Defendants Bushmills Ethanol, Inc, et al., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 30, 2015; 3 pages including Certificate of Service, Document No. 1508.

Cleantech's Response to Defendants' Surreply, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jun. 30, 2015; 6 pages including Certificate of Service, Document No. 1510.

Notice of Filing Responsive to Jun. 24, 2015 Court Order (DKT #1506), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jul. 1, 2015; 3 pages including Certificate of Service, Document No. 1511.

Cleantech's Motion to Quash Defendants' Subpoenas of Raymon Bean and Leah Schaat, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jul. 6, 2015; 9 pages including Certificate of Service, Document No. 1521.

Motion to Attend Jul. 8, 2015 Hearing Via Telephone by Defendant Lincolnway Energy, LLC., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jul. 6, 2015; 3 pages including Certificate of Service, Document No. 1522.

Motion to Attend Jul. 8, 2015 Hearing Via Telephone by Defendant Blue Flint Ethanol LLC, et al., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jul. 6, 2015; 4 pages including Certificate of Service, Document No. 1520.

Plaintiff's Submission Pursuant to the Court's Jun. 24 Order, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jul. 1, 2015; 12 pages including Certificate of Service, Document No. 1514.

Defendant Letter to Hon. Larry J. McKinney, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; dated Jul. 7, 2015; 1 page, Document No. 1526.

Exhibit Document Comparison of Jul. 31, 2003 Offer Letter to Agri-Energy, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Jul. 7, 2015; 4 pages, Document No. 1526-1.

Scrolling Exhibit Time Line: Time Line of Fact Relevant to Inequitable Conduct, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Jul. 7, 2015; 5 pages, Document No. 1526-2.

Entry & Order for Wednesday Jul. 8, 2015, in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; ordered Jul. 9, 2015; 5 pages, Document No. 1528.

Order Denying Motion to Compel/Reschedule Pretrial Conference, in the United States District Court, Southern District of Indiana, Indianapolis, Division, in re: Method of Processing Ethanol Byproducts

(56) References Cited

OTHER PUBLICATIONS and Related Subsystems ('858) Patent Litigation; Master Case. No. 1:10-ml-02181-LJM-DML; dated Jul. 9, 2015; 3 pages, Document No. 1529.
Adkins's Response to the Court's Request (D.E. 1505) for Clarification Regarding Adkins's Inequitable-Conduct Counterclaim, in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Jul. 10, 2015; 3 pages, Document No. 1530.
Adkins's Response to the Court's Request for a Discovery Plan, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Jul. 10, 2015; 3 pages including Certificate of Service, Document No. 1531.
Notice of Filing of Adkins Energy, LLC., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Jul. 14, 2015; 3 pages including Certificate of Service, Document No. 1534.
GS Cleantech Corporation's Proposed Damages Discovery Plan and Response to Adkins Clarification Regarding Inequitable Conduct Counterclaim, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Jul. 17, 2015; 5 pages including Certificate of Service, Document No. 1538.
Defendants' Memorandum of Law in Opposition to Plaintiff's Motion to Strike the Expert Reports of David R. Spencer and Keith Jones, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Jul. 23, 2015; 14 pages, Document No. 1543.
Cleantech's Reply Memorandum of Law in Further Support of its Motion to Strike the Expert Reports of David R. Spencer and Keith Jones, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Jul. 30, 2015; 11 pages including Certificate of Service, Document No. 1548.
Declaration of Michael J. Rye in Support of Cleantech's Reply Memorandum of Law in Further Support of its Motion to Strike theExpert Reports of David R. Spencer and Keith Jones, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Jul. 30, 2015; 5 pages including Certificate of Service, Document No. 1549.
Defendants' Expedited Motion to Compel Depositions of David Cantrell, David Winsness, Greg Barlage and Whit Davis, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Jul. 31, 2015; 5 pages including Certificate of Service, Document No. 1551.
Cleantech's Opposition to Defendants' Motion to Compel Depositions of David Cantrell, David Winsness, Greg Barlage and Whit Davis, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Aug. 6, 2015; 7 pages including Certificate of Service, Document No. 1558.
Defendants' Reply Re: Expedited Motion to Compel Depositions of David Cantrell, David Winsness, Greg Barlage and Whit Davis, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Aug. 7, 2015; 7 pages including Certificate of Service, Document No. 1559.
Defendants' Scheduling Notice of the Deposition of Andrew Dorisio, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Aug. 11, 2015; 3 pages including Certificate of Service, Document No. 1560.
Defendants' Motion for Leave to Conduct the Deposition of Andrew Dorisio in the District Court, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Aug. 17, 2015; 3 pages including Certificate of Service, Document No. 1564.
Suggestion of Remand, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 1, 2015; 1 page, Document No. 1566.
Defendants' Motions in Limine to Exclude or Limit Evidence Introduced at Trial by Plaintiff, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 6 pages including Certificate of Service, Document No. 1567.
Exhibit A, Plaintiff, GS Cleantech Corporation's Answers to Iroquois Bio-Energy Company, LLC's First Set of Interrogatories, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 6 pages including Certificate of Service, Document No. 1567-1.
Defendants' Motions in Limine to Preclude Rebuttal Testimony and Opinions of Plaintiff's Document Forensic Expert Aginsky at Trial, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 7 pages including Certificate of Service, Document No. 1568.
Exhibit A, Plaintiff, Deposition of Valery Aginsky, Ph.D., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 10 pages including Certificate of Service, Document No. 1568-1.
Forensic Report of Gerald M. Laporte, M.S.F.S. Supplemental Report 1, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 57 pages, Document No. 1568-2.
Laporte Support (Part 1), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 88 pages, Document No. 1568-3.
Laporte Support (Part 2), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 68 pages, Document No. 1568-4.
Plaintiff GS Cleantech Corporation's Witness List, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 4 pages, Document No. 1569.
Plaintiff's Deposition Designations, filed in the United States District Court, Southern District of Indiana, Indianapolis, Division, in

(56) References Cited

OTHER PUBLICATIONS re: Method of Processing Ethanol Byproducts and Related Subsystems ('858) Patent Litigation; Master Case. No. 1:10-ml-02181-LJM-DML; filed Sep. 10, 2015; 3 pages including Certificate of Service, Document No. 1570.
Plaintiff's GS Cleantech Corporation's Motion in Limine to Exclude Expert Testimony of Brian R. Stanton, Ph.D., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 14 pages including Certificate of Service, Document No. 1571.
Exhibit 1, Expert Report of Brian R. Stanton, Ph.D., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 65 pages, Document No. 1571-1.
Exhibit 2, Deposition of Brian Roberts-Stanton, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 13 pages, Document No. 1571-2.
Exhibit 3, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 4 pages, Document No. 1571-3.
Exhibit 4 (Part 1), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 13 pages, Document No. 1571-4.
Exhibit 4 (Part 2), filed in the United States District Court, Southern District of Indiana, Indianapolis, Division, in re: Method of Processing Ethanol Byproducts and Related Subsystems ('858) Patent Litigation; Master Case. No. 1:10-m1-02181-LJM-DML; filed Sep. 10, 2015; 10 pages, Document No. 1571-5.
Exhibit 5, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 5 pages, Document No. 1571-6.
Exhibit 6, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 7 pages, Document No. 1571-7.
Cleantech's Motion in Limine to Exclude Theories or Evidence Regarding Inequitable Conduction with Respect to U.S. Pat. No. 8,168,037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 6 pages including Certificate of Service, Document No. 1572.
Plaintiff GS Cleantech Corporation's Pretrial Exhibit List, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 37 pages including Certificate of Service, Document No. 1573.
Plaintiff Trial Brief, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 26 pages including Certificate of Service, Document No. 1574.

Cleantech's Motion in Limine to Exclude the Expert Testimony of Gerald M. Laporte, MS.F.S., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 13 pages including Certificate of Service, Document No. 1575.
Exhibit 1, Forensic Report of Gerald M. Laporte, M.S.F.S., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 7 pages including Certificate of Service, Document No. 1568.
Exhibit 2 (Part 1), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 52 pages, Document No. 1575-2.
Exhibit 2 (Part 2), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 50 pages, Document No. 1575-3.
Exhibit 2 (Part 3), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 46 pages, Document No. 1575-4.
Exhibit 3, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 38 pages, Document No. 1575-5.
Exhibit 4 (Report on Forensic Examination of Documents), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 31 pages, Document No. 1575-6.
Defendant's Inequitable Conduct Trial Opening Brief, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 35 pages, Document No. 1576.
Defendant's Witness and Exhibit List and Deposition Designations, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 49 pages, Document No. 1577.
Defendant's Certificate of Service, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 1 page, Document No. 1580.
Defendant's Motion to Compel Production of Documents Reflecting Attorney-client Communications Regarding Inventors Dealings with Agri-Energy in 2003, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 12 pages including Certificate of Service, Document No. 1581.
Exhibit 1 (Deposition of Peter R. Hagerty), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 10, 2015; 5 pages, Document No. 1581-1.
Exhibit 2 (Deposition of Peter R. Hagerty—Sep. 2, 2015), filed in the United States District Court, Southern District of Indiana, Indianapolis, Division, in re: Method of Processing Ethanol Byproducts

(56) References Cited

OTHER PUBLICATIONS and Related Subsystems ('858) Patent Litigation; Master Case. No. 1:10-ml-02181-LJM-DML; filed Sep. 10, 2015; 8 pages, Document No. 1581-2.

Certificate of Service-Motion to Compel Production of Documents, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 11, 2015; 1 page, Document No. 1582.

Notice by Defendants' (Exception of Adkins Energy) Requesting Availability of Electronic Presentation Equipment in the Courtroom for Inequitable Conduct Trial, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 14, 2015; 3 pages, Document No. 1586.

Defendants' Brief in Opposition to Plaintiffs Motion in Limine to Exclude Expert Testimony of Brian R. Stanton, Ph.D., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 4 pages, Document No. 1598.

Order Striking Letter, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 14, 2015; 2 pages, Document No. 1585.

Notice by Plaintiff Requesting Availability of Electronic Presentation Equipment in the Courtroom for Inequitable Conduct Trial , filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 15, 2015; 3 pages, Document No. 1588.

Stipulations of Fact for Bench Trial (Proposed), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 4 pages, Document No. 1589.

Defendants' Motion to Sequester Fact Witnesses at Trial, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 3 pages, Document No. 1590.

Defendants' Opposition to Cleantech's Motion in Limine to Exclude Theories or Evidence Regarding Inequitable Conduction [sic] With Respect to U.S. Pat. No. 8,168,037, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 8 pages, Document No. 1591.

Defendants' Opposition to Cleantech's Motion in Limine to Exclude the Expert Testimony of Gerald M. Laporte, M.S.F. S., filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 11 pages, Document No. 1592.

Exhibit A (Deposition of Gerald M. LaPorte—Dec. 11, 2014), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 12 pages, Document No. 1592-1.

Exhibit B (Deposition of Gerald M. LaPorte, p. 1297), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 1 page, Document No. 1592-2.

Exhibit D (Deposition of Gerald M. LaPorte), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 8 pages, Document No. 1592-4.

Exhibit D (Deposition of Valery Aginsky, Ph.D., (Mar. 12, 2015), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 7 pages, Document No. 1592-3.

Plaintiff's Amended Trial Exhibit List, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 124 pages, Document No. 1593.

Plaintiff's GS Cleantech Corporation's Amended Witness List, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 4 pages, Document No. 1594.

Cleantech's Motion to Strike Defendant's Designation of Keith J. Jones as a Fact Witness, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 5 pages, Document No. 1595.

Exhibit 1 (Email Chain from Michael F. Buchanan to Michael Rye, et al., dated Sep. 17, 2015), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 4 pages, Document No. 1595-1.

Exhibit 2 (Expert Forensic Report), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 10 pages, Document No. 1595-2.

Cleantech's Opposition to Defendants' Motion in Limine to Preclude Rebuttal Testimony and Opinions of Plaintiff's Document Forensic Expert Aginsky at Trial, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 13 pages, Document No. 1596.

Exhibit 1 (Deposition of Gerald M. LaPorte, Dec. 11, 2014), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 17 pages, Document No. 1596-1.

Exhibit 2 (Aginsky Forensic Document Dating Laboratory, Inc. ), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 31 pages, Document No. 1596-2.

Exhibit 3 (Forensic Report of Gerald M. Laporte, M.S.F.S.), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 69 pages, Document No. 1596-3.

(56) References Cited

OTHER PUBLICATIONS

Exhibit 4 (Deposition of Valery Aginsky, Ph.D.—Mar. 12, 2015), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 7 pages, Document No. 1596-4.
Exhibit 5 (Forensic Report of Gerald M. LaPorte, M.S.F.S.), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 69 pages, Document No. 1596-5.
Plaintiff's Opposition to Defendants' Motion in Limine to Exclude or Limit Evidence Introduced at Trial by Plaintiff, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 12 pages, Document No. 1597.
Exhibit 1 (Deposition of David Cantrell vol. v—Jun. 24, 2013), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 5 pages, Document No. 1597-1.
Exhibit 2 (GS Cleantech Corporation's Reply to Iroquois Bio-Energy Company, LLC's Response to its Motion to Quash Iroquois' Subpoena of Attorney Charles F. O'Brien), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Jun. 27, 2013; 5 pages, Document No. 1597-2.
Exhibit 3 (Order Denying Plaintiff's Motion to Strike Portions of Expert Reports of Anthony Wechselberger), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 8 pages, Document No. 1597-3.
Exhibit 4 (Deposition of David Winsness, vol. VIII—Jun. 26, 2013), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 6 pages, Document No. 1597-4.
Exhibit 1 (Deposition of Peter Hagerty—Sep. 2, 2015), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 6 pages, Document No. 1599-1.
Cleantech's Opposition to Defendants' Motion to Compel Production of Documents & Cross Motion to Claw Back the Inadvertent and Unintentional Disclosure of an Attorney-Client Communication, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 16 pages, Document No. 1599.
Exhibit 2 (Deposition of Andrew Dorisio, vol. II—Aug. 13, 2015), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 5 pages, Document No. 1599-2.
Defendants' Motion to Exclude Evidence Relating to the Prosecution of Patents not in Suit, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 8 pages, Document No. 1600.
Defendants' Response to Plaintiff's Trial Brief, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 18 pages, Document No. 1603.
Defendants' Objections to Plaintiff GS Cleantech Corporation's Pretrial Exhibit List, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 91 pages, Document No. 1602.
Plaintiff's Response to Defendant's Trial Brief, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 17, 2015; 23 pages, Document No. 1601.
Order Striking Stipulations of Fact (Proposed), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 15, 2015; 2 pages, Document No. 1587.
Exhibit 1 (Deposition of Peter Hagerty—Sep. 2, 2015), filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 21, 2015; 10 pages, Document No. 1607-1.
Defendants' Reply to Motion to Compel Production of Documents Reflecting Attorney-Client Communications Regarding Inventors' Dealings & Motion to Claw Back the Inadvertent and Unintentional Disclosure of a Attorney-Client Communication, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; filed Sep. 21, 2015; 13 pages, Document No. 1607.
Deposition Exhibit 112; Ethanol System VDS Process Drawing internally prepared on Jul. 22, 2003, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; 3 pages.
Deposition Exhibit 110; Email string beginning with David F. Cantrell to Gerald Winter and Jay Sommers Titled "FW: VDS System Update," dated Jul. 5, 2003, filed in the United States District Court, Southern District of Indiana, Indianapolis, Division in re: Method of Processing Ethanol Byproducts and Related Subsystems ('858) Patent Litigation; Master Case. No. 1:10-ml-02181-LJM-DML; 3 pages.
Deposition Exhibit 639; Internal Email from David F. Cantrell to Ed Pearce, Rod Lee,Keith Rinehart and David Winsness Titled "FW: List of Ethanol Production Facilities," dated Aug. 27, 2003, filed in the United States District Court, Southern District of Indiana, Indianapolis, Division in re: Method of Processing Ethanol Byproducts and Related Subsystems ('858) Patent Litigation; Master Case. No. 1:10-ml-02181-LJM-DML; 5 pages.
Deposition Exhibit 133; Test Results from Alfa Laval, prepared sometime around Jun. 2003, filed in the United States District Court, Southern District of Indiana, Indianapolis, Division in re: Method of Processing Ethanol Byproducts and Related Subsystems ('858) Patent Litigation; Master Case. No. 1:10-ml-02181-LJM-DML; 21 pages.
Deposition Exhibit 101; Internal Email from David R. Cantrell to Mark Lautenberg et al., dated Jun. 5, 2003, filed in the United States District Court, Southern District of Indiana, Indianapolis, Division

(56) References Cited

OTHER PUBLICATIONS in re: Method of Processing Ethanol Byproducts and Related Subsystems ('858) Patent Litigation; Master Case. No. 1:10-ml-02181-LJM-DML; 1 page.
Deposition Exhibit 114; Email from David R. Cantrell to Jay Sommers, dated Jun. 5, 2003, Titled "Ethanol Oil Recovery Testing" filed in the United States District Court, Southern District of Indiana, Indianapolis, Division in re: Method of Processing Ethanol Byproducts and Related Subsystems ('858) Patent Litigation; Master Case. No. 1:10-ml-02181-LJM-DML; 7 pages.
Deposition Exhibit 131; Ethanol Syrup Testing Order, sometime in or prior to Jul. 2003, filed in the United States District Court, Southern District of Indiana, Indianapolis, Division in re: Method of Processing Ethanol Byproducts and Related Subsystems ('858) Patent Litigation; Master Case. No. 1:10-ml-02181-LJM-DML; 1 page.
Deposition Exhibit 136; Email string beginning with David Winsness to Bill Strong, Jun. 10, 2003, Titled "VDS agents", filed in the United States District Court, Southern District of Indiana, Indianapolis, Division in re: Method of Processing Ethanol Byproducts and Related Subsystems ('858) Patent Litigation; Master Case. No. 1:10-ml-02181-LJM-DML; 1 page.
Deposition Exhibit 211; Email string beginning with David Cantrell to Gerald Winters et al. dated Jun. 5, 2003, Titled "VDS System Update", filed in the United States District Court, Southern District of Indiana, Indianapolis, Division in re: Method of Processing Ethanol Byproducts and Related Subsystems ('858) Patent Litigation; Master Case. No. 1:10-ml-02181-LJM-DML; 4 pages.
Deposition Exhibit 107; Vortex Dehydration Technologies, LLC, Jul. 11, 2003, Titled "Alfa Laval Oil Recovery Unit", filed in the United States District Court, Southern District of Indiana, Indianapolis, Division in re: Method of Processing Ethanol Byproducts and Related Subsystems ('858) Patent Litigation; Master Case. No. 1:10-ml-02181-LJM-DML; 4 pages.
Deposition Exhibit 108; Vortex Dehydration Techologies, LLC, Jul. 11, 2003, Titled "VDT Oil Recovery Unit",, filed in the United States District Court, Southern District of Indiana, Indianapolis, Division in re: Method of Processing Ethanol Byproducts and Related Subsystems ('858) Patent Litigation; Master Case. No. 1:10-ml-02181-LJM-DML; 4 pages.
Pacific Ethanol, Inc's Final Invalidity Contentions, filed in the United States District Court, Southern District of Indiana, Indianapolis, Division, in re: Methods of Processing Ethanol Byproducts and Related Subsystem ('858) Patent Litigation; Master Case. No. 1:10-ml-02181-LJM-DML; dated Aug. 22, 2014; 42 pages, including Certificate of Service.
Pacific Ethanol Stockton, LLC's, Inc's Final Invalidity Contentions, filed in the United States District Court, Southern District of Indiana, Indianapolis, Division, in re: Methods of Processing Ethanol Byproducts and Related Subsystem ('858) Patent Litigation; Master Case. No. 1:10-ml-02181-LJM-DML; dated Aug. 22, 2014; 42 pages, including Certificate of Service.
Homeland Energy Solutions, LLC's Final Invalidity Contentions, filed in the United States District Court, Southern District of Indiana, Indianapolis, Division, in re: Methods of Processing Ethanol Byproducts and Related Subsystem ('858) Patent Litigation; Master Case. No. 1:10-ml-02181-LJM-DML; dated Aug. 22, 2014; 42 pages, including Certificate of Service.
Aemetis Inc.'s Final Invalidity Contentions, filed in the United States District Court, Southern District of Indiana, Indianapolis, Division, in re: Methods of Processing Ethanol Byproducts and Related Subsystem ('858) Patent Litigation; Master Case. No. 1:10-ml-02181-LJM-DML; dated Aug. 22, 2014; 42 pages, including Certificate of Service.
Aemetis Advanced Fuels Keyes, Inc.'s Final Invalidity Contentions, filed in the United States District Court, Southern District of Indiana, Indianapolis, Division, in re: Methods of Processing Ethanol Byproducts and Related Subsystem ('858) Patent Litigation; Master Case. No. 1:10-ml-02181-LJM-DML; dated Aug. 22, 2014; 42 pages, including Certificate of Service.
Motion to Quash Subpoena of Dennis Vander Griend, filed in the United States District Court, Southern District of Indiana, Indianapolis, Division, in re: Methods of Processing Ethanol Byproducts and Related Subsystem ('858) Patent Litigation; Master Case. No. 1:10-ml-02181-LJM-DML; dated Sep. 15, 2014; 2 pages, including Certificate of Service, Document No. 1288.
Memorandum of Law in Support of Motion to Quash Subpoena of Dennis Vander Griend, filed in the United States District Court, Southern District of Indiana, Indianapolis, Division, in re: Methods of Processing Ethanol Byproducts and Related Subsystem ('858) Patent Litigation; Master Case. No. 1:10-ml-02181-LJM-DML; dated Sep. 15, 2014; 7 pages, including Certificate of Service, Document No. 1289.
Tag-Along Defendants Aemetis, Inc et al., Motion to Strike Plaintiff's Newly Asserted Infringement Contentions, filed in the United States District Court, Southern District of Indiana, Indianapolis, Division, in re: Methods of Processing Ethanol Byproducts and Related Subsystem ('858) Patent Litigation; Master Case. No. 1:10-ml-02181-LJM-DML; dated Sep. 17, 2014; 6 pages, including Certificate of Service, Document No. 1291.
Joint Proposed Agenda, filed in the United States District Court, Southern District of Indiana, Indianapolis, Division, in re: Methods of Processing Ethanol Byproducts and Related Subsystem ('858) Patent Litigation; Master Case. No. 1:10-ml-02181-LJM-DML; dated Sep. 16, 2014; 6 pages, Document No. 1290.
Tag-Along Defendants Aemetis, Inc et al., Motion to Strike Plaintiff's Newly Asserted Infringement Contentions, filed in the United States District Court, Southern District of Indiana, Indianapolis, Division, in re: Methods of Processing Ethanol Byproducts and Related Subsystem ('858) Patent Litigation; Master Case. No. 1:10-ml-02181-LJM-DML; dated Sep. 18, 2014; 6 pages, including Certificate of Service, Document No. 1293.
Tag-Along Defendants Aemetis, Inc et al., Brief in Support of Motion to Strike Plaintiff's Newly Asserted Infringement Contentions, filed in the United States District Court, Southern District of Indiana, Indianapolis, Division, in re: Methods of Processing Ethanol Byproducts and Related Subsystem ('858) Patent Litigation; Master Case. No. 1:10-ml-02181-LJM-DML; dated Sep. 18, 2014; 14 pages, including Certificate of Service, Document No. 1294.
Notice of Filing Under Seal, filed in the United States District Court, Southern District of Indiana, Indianapolis, Division, in re: Methods of Processing Ethanol Byproducts and Related Subsystem ('858) Patent Litigation; Master Case. No. 1:10-ml-02181-LJM-DML; dated Sep. 18, 2014; 3 pages, including Certificate of Service, Document No. 1295.
Order and Entry from Telephone Status Conference, filed in the United States District Court, Southern District of Indiana, Indianapolis, Division, in re: Methods of Processing Ethanol Byproducts and Related Subsystem ('858) Patent Litigation; Master Case. No. 1:10-ml-02181-LJM-DML; dated Sep. 23, 2014; 3 pages, Document No. 1297.
Notice of Written Consent to Correct and/or Amendment the Complaints Against Guardian Energy, LLC, et al., filed in the United States District Court, Southern District of Indiana, Indianapolis, Division, in re: Methods of Processing Ethanol Byproducts and Related Subsystem ('858) Patent Litigation; Master Case. No. 1:10-ml-02181-LJM-DML; dated Sep. 30, 2014; 3 pages, including Certificate of Service, Document No. 1298.
Second Amended Complaint for Patent Infringement Against Guardian Energy, LLC and ICM, Inc., filed in the United States District Court, Southern District of Indiana, Indianapolis, Division, in re: Methods of Processing Ethanol Byproducts and Related Subsystem ('858) Patent Litigation; Master Case. No. 1:10-ml-02181-LJM-DML; dated Sep. 30, 2014; 16 pages, including Certificate of Service, Document No. 1299.
Second Amended Complaint for Patent Infringement Against Western New York Energy, LLC and ICM., filed in the United States District Court, Southern District of Indiana, Indianapolis, Division, in re: Methods of Processing Ethanol Byproducts and Related Subsystem ('858) Patent Litigation; Master Case. No. 1:10-ml-02181-LJM-DML; dated Sep. 30, 2014; 16 pages, including Certificate of Service, Document No. 1301.

(56) References Cited

OTHER PUBLICATIONS

Second Amended Complaint for Patent Infringement Against Southwest Iowa Renewable Energy, LLC and ICM., filed in the United States District Court, Southern District of Indiana, Indianapolis, Division, in re: Methods of Processing Ethanol Byproducts and Related Subsystem ('858) Patent Litigation; Master Case. No. 1:10-ml-02181-LJM-DML; dated Sep. 30, 2014; 16 pages, including Certificate of Service, Document No. 1300.
First Amended Complaint for Patent Infringement Adding Defendant ICM., filed in the United States District Court, Southern District of Indiana, Indianapolis, Division, in re: Methods of Processing Ethanol Byproducts and Related Subsystem ('858) Patent Litigation; Master Case. No. 1:10-ml-02181-LJM-DML; dated Sep. 30, 2014; 14 pages, including Certificate of Service, Document No. 1302.
Pacific Ethanol Stockton, LLC's Final Invalidity Contentions, filed in the United States District Court, Southern District of Indiana, Indianapolis, Division, in re: Methods of Processing Ethanol Byproducts and Related Subsystem ('858) Patent Litigation; Master Case. No. 1:10-ml-02181-LJM-DML; dated Aug. 22, 2014; 42 pages, including Certificate of Service.
Redacted Order on Cross Motions for Summary Judgment, filed in the United States District Court, Southern District of Indiana, Indianapolis, Division, in re: Method of Processing Ethanol Byproducts and Related Subsystems ('858) Patent Litigation; Master Case. No. 1:10-ml-02181-LJM-DML; on Nov. 13, 2014, Document 1383; 233 pages.
Declaration of David Fred Cantrell dated Nov. 8, 2010 with Exhibits A and B; 9 pgs.
Email from Kathleen Gleason to John Weyrauch (chain email) entitled "In Re: Method of Processing Ethanol Byproducts and Related Subsystems ("858) Patent Litigation, MDL Case No. 1:10-ml-LJM-DML-VDT Subpoena 2 of 5", with attachments dated Oct. 28, 2011; (Exhibit No. 144); 23 pages.
Email from David Winsness to Ed Pearche, Rod Lee, Frank Polifka and David F. Cantrell (chain email) entitled "Ethanol Provisional Patent Application", Sep. 2, 2004:(Exhibit No. 145), 11 pages.
Email from David Cantrell to Gerald Winter and Jay Sommers with Mark Lauderbaugh, David Winsness, Whit Davis, Greg Barlage and Bent Ludvigsen entitled "Oil Recovery", dated Jun. 29, 2003; 1 page.
Email from David Cantrell to Ed Pearche, Rod Lee, Keith Rinehart and David Winsness (chain email) entitled "List of Ethanol Production Facilities", dated Aug. 27, 2003; (p. 28 of 34),1 page.
Email from David Winsness to Frank Polifka, Jerry Dyer, Keith Rinehart, Lee Jones, Mike Banks, Ray Lanier, Rod Lee, Wayne Tatum, Jim Wallace and Robert Hudson (chain email) entitled "Update", dated Aug. 19, 2003; (p. 30 of 34). 1 page.
Corrected Memorandum Opinion & Order After Bench Trial, dated Sep. 15, 2016, filed in the United States District Court, Southern District of Indiana, Indianapolis, Division, in re: Method of Processing Ethanol Byproducts and Related Subsystems ('858) Patent Litigation; Master Case No. 1:10-ml-02181-LJM-DML; 78 pages: (Document 1653).
Entry of Judgment Pursuant to Federal Rule of Civil Procedure 58, dated Sep. 15, 2016, filed in the United States District Court, Southern District of Indiana, Indianapolis, Division, in re: Method of Processing Ethanol Byproducts and Related Subsystems ('858) Patent Litigation; Master Case No. 1:10-ml-02181-LJM-DML; 2 pages: (Document 1654).
In RE: Method of Processing Ethanol Byproducts and Related Subsystems ('858) Patent Litigation; Filed in United States District Court Southern District of Indiana Indianapolis Division; Corrected Memorandum Opinion & Order After Bench Trial; Document 1653 Filed Sep. 15, 2016.
In RE: Method of Processing ) Ethanol Byproducts and ) Related Subsystems ('858) Patent ) Litigation;Filed in United States District Court Southern District of Indiana Indianapolis Division; Second Corrected Entry of Judgment Pursuant to Federal Rule of Civil Procedure 58; Document 1660 Filed Sep. 27, 2016.
In RE: Method of Processing Ethanol Byproducts and Related Subsystems ('858) Patent Litigation; Filed in United States District Court Southern District of Indiana Indianapolis Division; GS Cleantech Corporation's Rule 59(e) Motion to Alter or Amend Judgment; Document 1665 Filed Oct. 11, 2016.
In RE: Method of Processing Ethanol Byproducts and Related Subsystems ('858) Patent Litigation; Filed in United States District Court Southern District of Indiana Indianapolis Division; GS Cleantech Corporation's Memorandum of Law in Support of Its Rule 59(e) Motion to Alter or Amend Judgment; Document 1668 Filed Oct. 24, 2016—multiple documents.
In RE: Method of Processing Ethanol Byproducts and Related Subsystems ('858) Patent Litigation; Filed in United States District Court Southern District of Indiana Indianapolis Division; Defendants' Joint Opposition to Plaintiffs' Rule 59(e) Motion to Alter or Amend Judgment; Document 1671 Filed Nov. 21, 2016.
In RE: Method of Processing Ethanol Byproducts and Related Subsystems ('858) Patent Litigation; Filed in United States District Court Southern District of Indiana Indianapolis Division; GS Cleantech's Reply in Support of Its Rule 59(e) Motion to Amend or Alter the Judgment; Document 1675 Filed Dec. 12, 2016.
In RE: Method of Processing Ethanol Byproducts and Related Subsystems ('858) Patent Litigation; Filed in United States District Court Southern District of Indiana Indianapolis Division; Motion for Reconsideration of the Denial of Plaintiffs' Motion to Defer Briefing and for Clarification or Reconsideration of the Schedule for Briefing Defendants' Exceptional Case Motion (MDN 1677); Document 1679 Filed Jan. 27, 2017 15 Pages.
In RE: Method of Processing Ethanol Byproducts and Related Subsystems ('858) Patent Litigation; Filed in United States District Court Southern District of Indiana Indianapolis Division; Order; Document 1677 Filed Jan. 19, 2017.
In RE: Method of Processing Ethanol Byproducts and Related Subsystems ('858) Patent Litigation; Filed in United States District Court Southern District of Indiana Indianapolis Division; Defendants' Joint Brief in Opposition to Plaintiffs' Motion for Reconsideration [MDN 1679]; Document 1733 Filed Jan. 12, 2018.
In RE: Method of Processing Ethanol Byproducts and Related Subsystems ('858) Patent Litigation; Filed in United States District Court Southern District of Indiana Indianapolis Division; Cleantech's Reply Brief in Support of Its Motion for Reconsideration of the Denial of Its Rule 59(E) Motion to Amend or Alter the Judgment and Its Motion to Defer Briefing on Attorneys' Fees; Document 1734 Filed Jan. 26, 2018.
In RE: Method of Processing Ethanol Byproducts and Related Subsystems ('858) Patent Litigation; Filed in United States District Court Southern District of Indiana Indianapolis Division; Order; Document 645 Filed Feb. 1, 2018.
Appeal Brief filed in the United States Court of Appeals for the Federal Circuit Case Nos. 16-2231 filed Aug. 29, 2018.

* cited by examiner

METHOD OF PROCESSING ETHANOL BYPRODUCTS AND RELATED SUBSYSTEMS

CROSS REFERENCE TO RELATED APPLICATIONS

The present application is a continuation of U.S. patent application Ser. No. 13/450,997, filed Apr. 19, 2012, which is a continuation of U.S. patent application Ser. No. 13/107,197, filed May 13, 2011, (now U.S. Pat. No. 8,283,484) which is a continuation of U.S. application Ser. No. 11/241,231, filed on Sep. 30, 2005, (now U.S. Pat. No. 8,008,516) and U.S. patent application Ser. No. 12/559,136 filed on Sep. 14, 2009, (now U.S. Pat. No. 8,008,517), which is a continuation of U.S. application Ser. No. 11/122,859, filed on May 5, 2005, (now U.S. Pat. No. 7,601,858) and which claims the benefit of priority under 35 USC 119(e) to U.S. Provisional Application No. 60/602,050, filed on Aug. 17, 2004. The present application is also related to U.S. patent application Ser. No. 12/475,781 filed on Jun. 1, 2009, which is a continuation of U.S. Pat. No. 7,601,858; all of which are incorporated by reference in their entireties.

COPYRIGHT STATEMENT

A portion of the disclosure of this document contains material subject to copyright protection. No objection is made to the facsimile reproduction of the patent document or this disclosure as it appears in the Patent and Trademark Office files or records, but any and all rights in the copyright(s) are otherwise reserved.

TECHNICAL FIELD

The present invention relates generally to recovering oil and, more particularly, to recovering oil from a byproduct of the dry milling process used to form ethanol.

BACKGROUND OF THE INVENTION

Over the past thirty years, significant attention has been given to the production of ethyl alcohol, or "ethanol," for use as an alternative fuel. Ethanol not only burns cleaner than fossil fuels, but also can be produced using grains such as corn, which are of course renewable resources. At present, approximately sixty-nine "dry milling" plants in the United States produce over two billion gallons of ethanol per year. Additional plants presently under construction are expected to add over four hundred million gallons to this total in an effort to meet the current high demand.

As noted in the foregoing discussion, a popular method of producing ethanol is known as "dry milling," and in the United States is typically practiced using corn. As is well known in the industry, the dry milling process utilizes the starch in the corn or other grain to produce the ethanol through fermentation, and creates a waste stream comprised of byproducts termed "whole stillage" (which may be further separated into products known as distillers wet grains and "thin stillage"). Despite containing valuable oil, this whole stillage has for the most part been treated as waste and used primarily to supplement animal feed (mostly in the form of distillers dried grains with solubles (DDGS), which is created by evaporating the thin stillage, recombining the resulting concentrate or syrup with the distillers wet grains, and drying the product to have a low moisture content; see, e.g., U.S. Pat. Nos. 5,662,810 and 5,958,233, the disclosures of which are incorporated herein by reference).

Efforts to recover the valuable oil from this byproduct have not been successful in terms of efficiency or economy. For example, one approach involves attempting to separate the oil from the thin stillage before the evaporation stage, such as using a centrifuge. However, spinning the thin stillage at this stage does not produce usable oil, but rather merely creates an undesirable emulsion phase requiring further processing. Moreover, the volume of thin stillage present is generally 2 to 10 times greater than the syrup, which requires considerable capital to purchase the number of centrifuges required. Together, these obstacles make attempts to recover oil from thin stillage highly inefficient and uneconomical.

U.S. Pat. No. 5,250,182 (the disclosure of which is incorporated herein by reference) describes the use of filters for removing substantially all solids and recovering lactic acid and glycerol from the thin stillage without the need for evaporation. Despite eliminating a step in the conventional process, the proposal results in a more complicated arrangement requiring multiple filtration steps. Wholesale elimination of the evaporator in the vast majority of existing plants is also unlikely and otherwise uneconomical. Filters, and especially the microfiltration and ultrafiltration types proposed in this patent, are also susceptible to frequent plugging and thus disadvantageously increase the operating cost. For these reasons, the filtration process proposed in this patent has not gained widespread commercial acceptance.

Accordingly, a need exists for a more efficient and economical manner of recovering oil from a byproduct containing it, such as thin stillage created during the dry milling process used to produce ethanol.

SUMMARY OF THE INVENTION

In accordance with one aspect of the invention, a method of processing a concentrated byproduct of a dry milling process for producing ethanol, such as by using corn, is disclosed. In its most basic form, the method comprises recovering oil from the concentrated byproduct.

In one embodiment, the byproduct comprises thin stillage, and the method includes the step of evaporating the thin stillage to form a concentrate. The recovering step may further comprise separating the oil from the concentrate using a disk stack centrifuge. Preferably, the recovering step comprises: (1) providing the concentrated byproduct at a temperature of between about 150 and 212° F. and, most preferably, at a temperature of about 180° F.; and/or (2) providing the concentrated byproduct having a pH of between about 3 and 6 and, most preferably, between about 3.5 and 4.5. Additionally, it is preferred that the concentrated byproduct have a moisture content greater than 15% by weight, more preferably a moisture content greater than 50% and less than 90% and, most preferably, a moisture content between about 60-85%. The step of recovering the oil from the concentrated byproduct produces syrup, and the method may further include the step of recovering oil from the syrup.

In accordance with another aspect of the invention, a more specific method of processing concentrated thin stillage created by a dry milling process for producing ethanol, such as from corn, is disclosed. The method comprises recovering oil from the concentrated thin stillage having a moisture content of less than about 90% by weight.

In one embodiment, the recovering step comprises separating the oil from the concentrate using a disk stack centrifuge. The method may further include the step of drying the concentrate after the removing step.

In accordance with still another aspect of the invention, a method of recovering oil from thin stillage is disclosed. The method comprises evaporating the thin stillage to create a concentrate having a moisture content of greater than 15% by weight and less than about 90% by weight. Oil is then recovered by centrifuging the concentrate, preferably using a disk stack centrifuge.

In accordance with yet another aspect of the invention, a method of processing whole stillage is disclosed. The method comprises recovering thin stillage including oil and solids from the whole stillage, concentrating the thin stillage including the solids, and recovering oil from the concentrate.

In one embodiment, the step of recovering the thin stillage includes using a separator selected from the group consisting of a press, extruder, a decanter centrifuge, and a screen centrifuge. The concentrating step may comprise processing the thin stillage to a temperature of between about 150 and 212° F., a pH of between about 3 and 6, and a moisture content of less than 90%. The step of recovering oil comprises separating the oil from the concentrate using a centrifuge. The recovering and concentrating steps may be performed in a continuous fashion. The method may further include drying the concentrate after recovering oil.

In accordance with a further aspect of the invention, a subsystem for use in a system for producing ethanol by dry milling and creating thin stillage as a byproduct is disclosed. The subsystem comprises an evaporator for evaporating the thin stillage to form a concentrate, and a centrifuge for receiving the concentrate and recovering oil therefrom. Preferably, the concentrate has a moisture content of less than about 90% by weight, and the centrifuge is a disk stack type.

Still a further aspect of the invention is a subsystem for use in a system for producing ethanol by dry milling and creating thin stillage as a byproduct. The subsystem comprises an evaporator for evaporating the thin stillage to form a concentrate and means for recovering oil from the concentrate. In one embodiment, the recovering means comprises a centrifuge and, most preferably, a disk stack centrifuge.

Yet a further aspect of the invention is the combination of a concentrate formed from thin stillage including oil and a centrifuge for removing at least a portion of the oil from the concentrate. Preferably, the concentrate has a moisture content of greater than 15% by weight and less than about 90% by weight, and the centrifuge is a self-cleaning bowl type of disk stack centrifuge, a nozzle bowl disk stack centrifuge, or a horizontal centrifugal decanter

DETAILED DESCRIPTION OF THE INVENTION

In accordance with one aspect of the invention, a method recovers oil from a byproduct resulting from the production of ethanol using a dry milling technique (which is extensively described in the above-referenced '182 patent). The byproduct, known as "thin stillage," is recovered by separating the distillers wet grain from the "whole stillage" leftover after fermentation is complete. As is known in the art, this mechanical separation may be accomplished using a press/extruder, a decanter centrifuge, or a screen centrifuge. Moisture is then removed from the unfiltered thin stillage to create a concentrate or syrup, such as through evaporation. Advantageously, usable oil is then easily recovered from this concentrated form of the byproduct through relatively simple mechanical processing, without the prior need for multiple stages of filtration or other expensive and complicated undertakings.

In one embodiment, oil is recovered from the concentrate by passing it through a centrifuge and, in particular, a disk stack centrifuge (and most preferably a self-cleaning bowl type). Preferably, the concentrate fed to the disk stack centrifuge is at a temperature of between about 150 and 212° F. (and ideally 180° F.) and a pH of between about 3 and 6 (ideally between about 3.5 and 4.5). As a result of the preceding evaporation step, the concentrate has a moisture content of greater than 15% and less than about 90%, more preferably between 30% and about 90%, and ideally about 60-85% by weight. Under these process conditions, the disk stack centrifuge is able to separate the oil in usable form from the concentrate in an efficient and effective manner, despite the relatively high level of solids present (which may be recovered from the centrifuge in a continuous or intermittent fashion, depending on the particular process conditions).

Besides creating usable oil, the concentrate or syrup recovered from the disk stack centrifuge is considered more valuable. This is because the post-evaporation processing to recover or remove the oil improves the efficiency of the drying process used on the combined concentrate syrup and distillers wet grains. A stable, flowable product for supplementing animal feed results, which thus further complements the value of the oil recovered.

Two examples are presented below to demonstrate the efficacy of the above-described method.

Example 1

Figure 1:
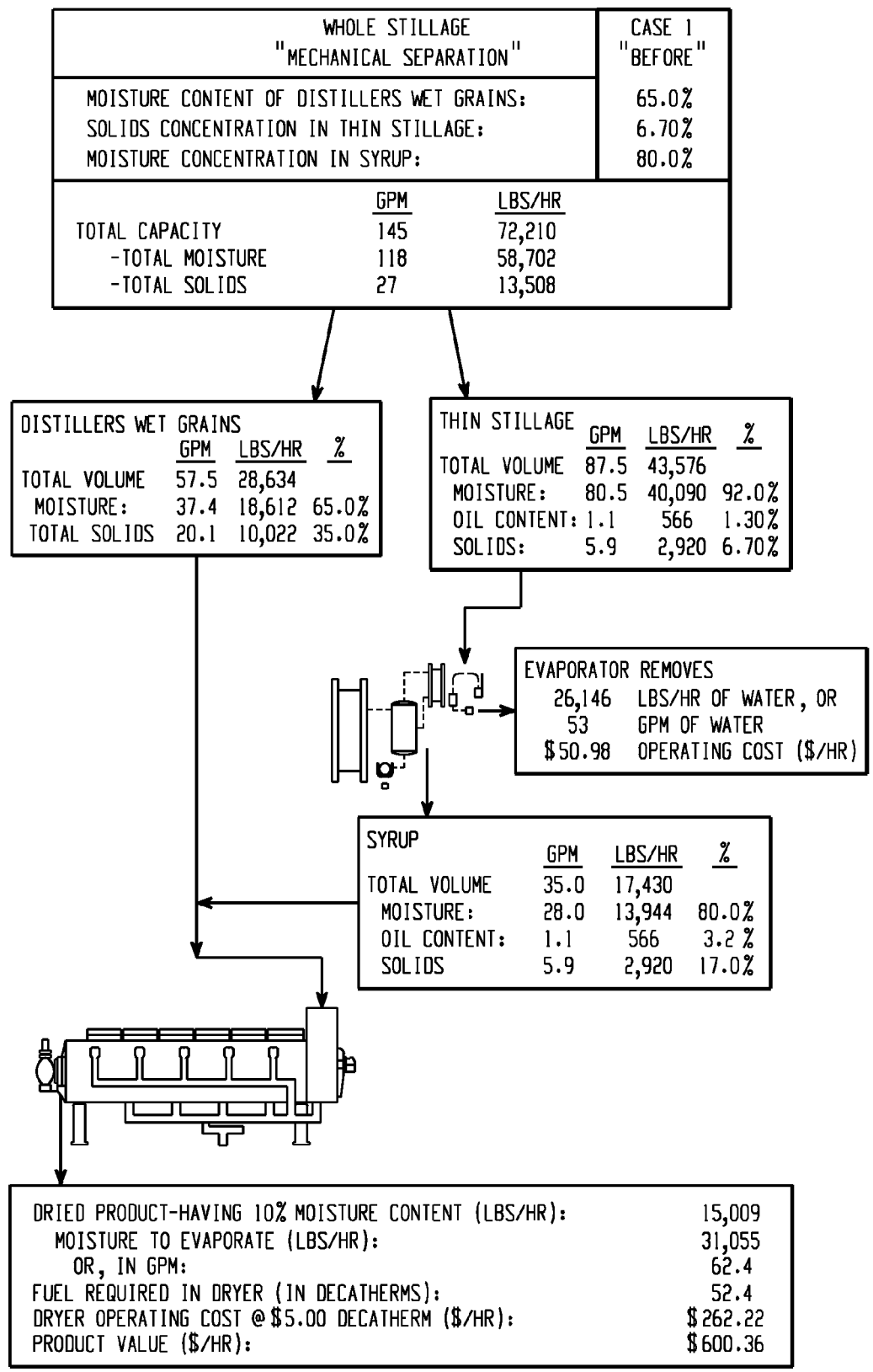
FIG. 1 is a partially schematic flow chart illustrating the processing of co-products formed during the ethanol extraction process.
Figure 2:
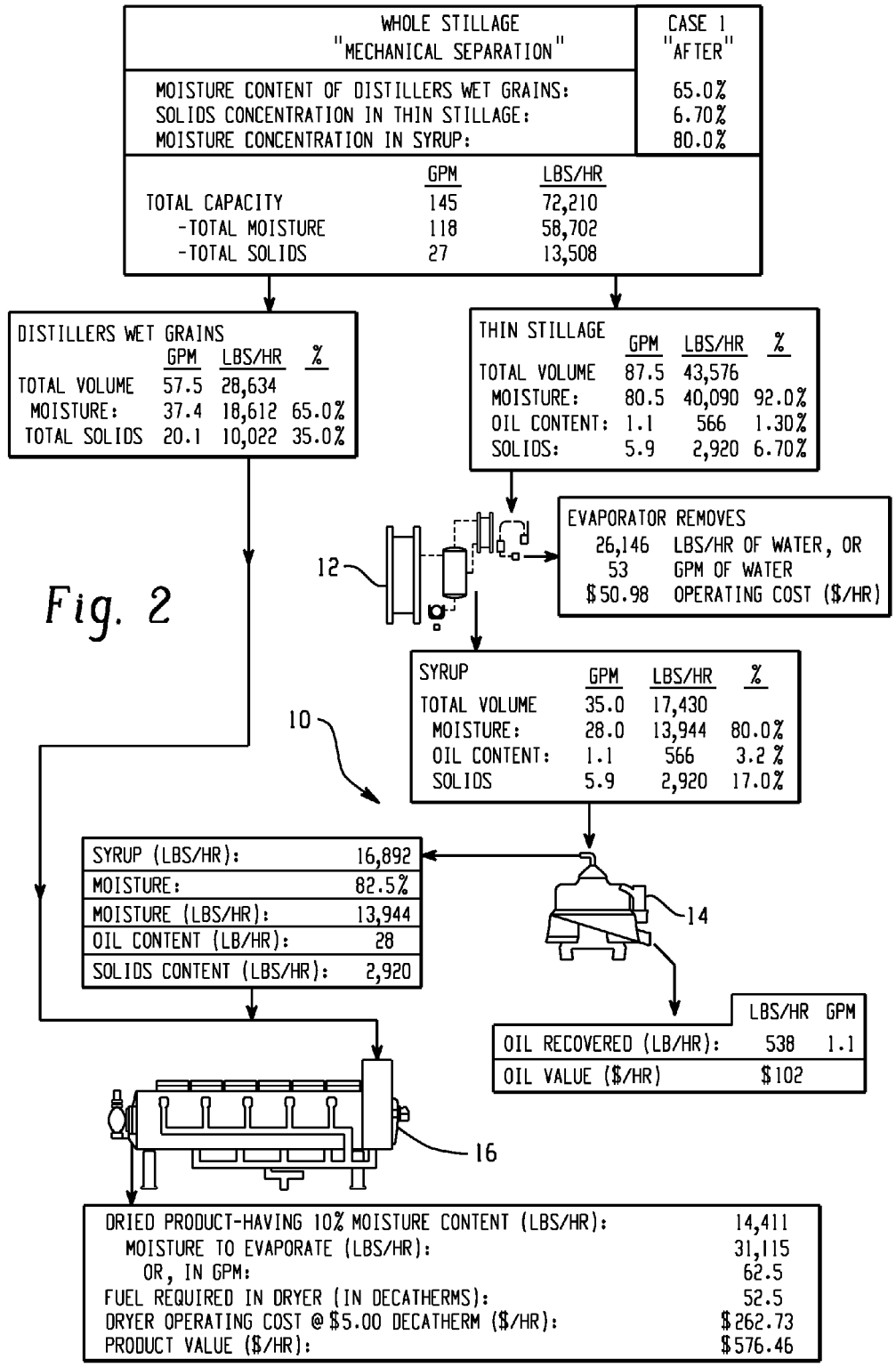
FIG. 2 is a partially schematic flow chart illustrating the recovery of oil from a syrup formed by evaporating the thin stillage.

Reference is made to FIGS. 1 and 2 to illustrate schematically a first example demonstrating the efficacy of the present method.

FIG. 1 represents one technique for processing whole stillage resulting from dry milling corn to create distillers dried grains with solubles. The whole stillage leftover after deriving the ethanol is mechanically separated into distillers wet grains (approx. 35% solids) and thin stillage (approx. 6.7% solids), such as by using a centrifugal decanter. The thin stillage is then introduced to an evaporator to create a syrup having a moisture content of approximately 80% by weight and about 17% solids by weight. The syrup is then recombined with the distillers wet grains, introduced to a drum dryer, and dried to reduce the overall moisture content to approximately 10% by weight. An estimated total value of the resulting distillers dried grains with solubles is $600.36 per hour.

FIG. 2 represents the inventive method and a related subsystem 10 for implementing it. Initial processing of the whole stillage is done in the same fashion, and the mechanically separated thin stillage is delivered to the evaporator 12 forming part of the subsystem 10. The resulting concentrate or syrup having a moisture content of approximately 80% by weight and a solids content of approximately 17% by weight is delivered to a disk stack centrifuge 14, and preferably a "solids ejecting" one, such as an Alfa Laval Model No. AFPX510, AFPX513, or AFPX617 or equivalent device. At an infeed rate of approximately 35 gallons per minute, this centrifuge 14 recovers usable oil at a rate of 538 pounds per hour and produces syrup having a having a moisture content of 82.5% by weight, but with far less oil in view of the preceding recovery step.

Recombining the syrup (which is substantially free of oil) from the centrifuge 14 with the distillers wet grains and drying in a drum dryer 16 to a moisture content of 10% by weight results in a product having a value of $576.46 per hour. However, the 538 pounds per hour of oil recovered has a product value of approximately $102 per hour. Accordingly, the total product value using the inventive method is $678.46 per hour, which is approximately 12% greater than the $600.36 per hour product value resulting from use of the conventional set-up shown in FIG. 1. Moreover, removal of the majority of the oil before the drying step makes the process more efficient, and results in an estimated energy savings of approximately 10%, or $26.27 per hour. As a result, product value per hour ($678.46) less the estimated dryer operating cost ($236.46 per hour with the 10% savings) and less the estimated evaporator operating cost ($50.98 per hour) is about $391.02 per hour.

Example 2

Figure 3:
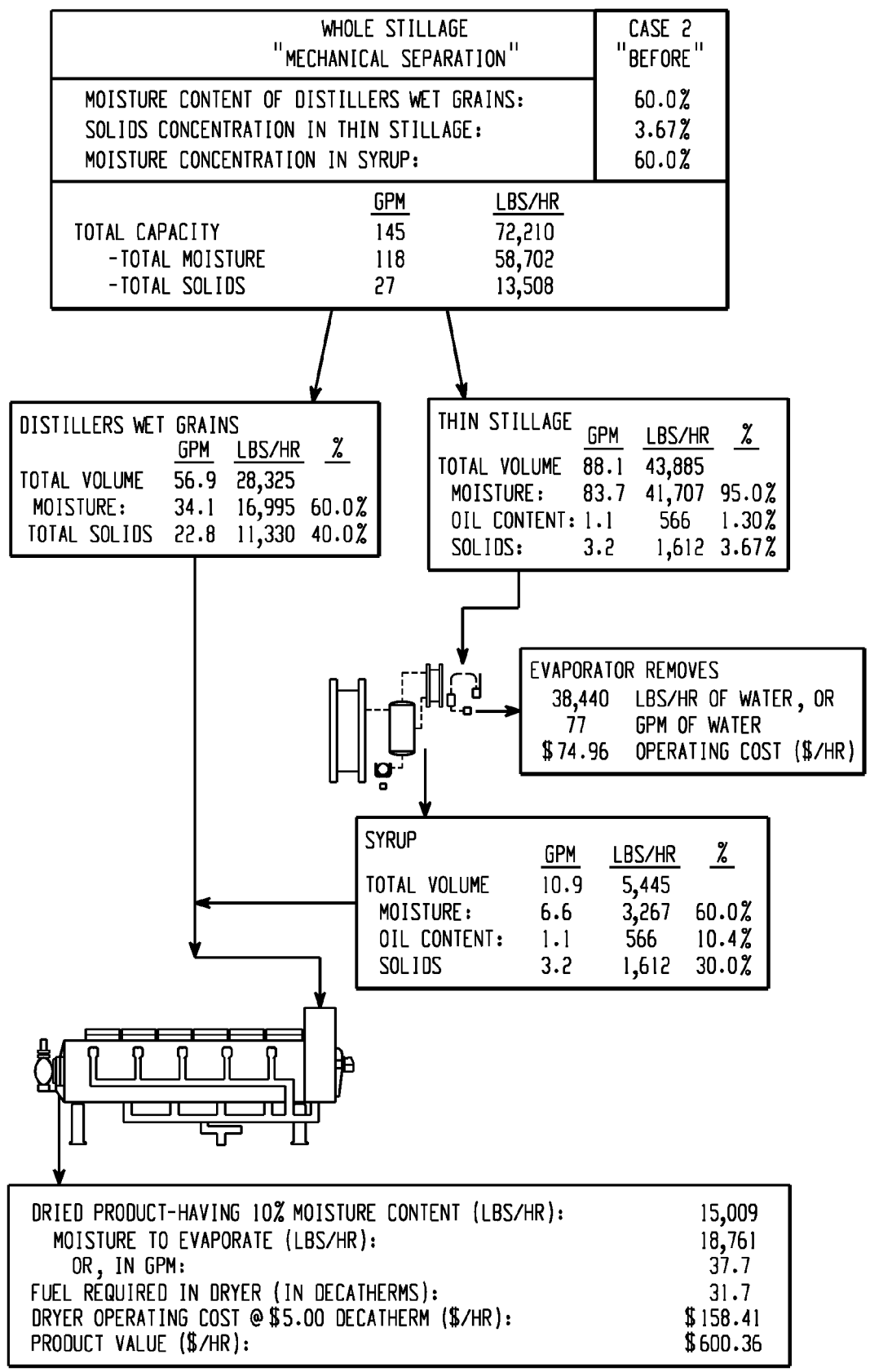
FIG. 3 is a schematic view similar to FIG. 1.
Figure 4:
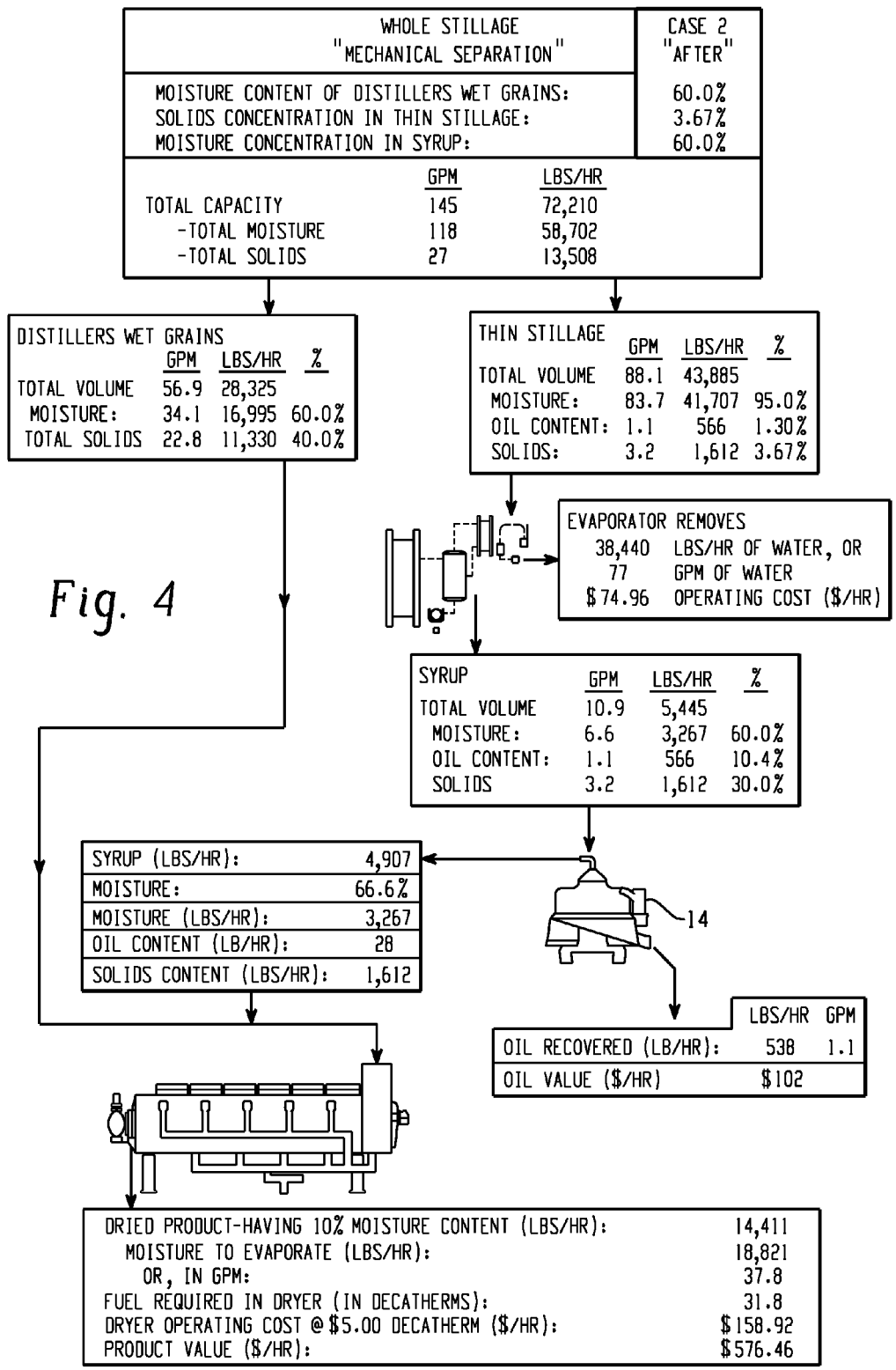
FIG. 4 is a schematic view similar to FIG. 2.

Reference is made to FIGS. 3 and 4, which illustrate a prophetic comparison between one processing method and the inventive method. The set-up is essentially the same as shown in FIGS. 1 and 2, but a more effective centrifugal decanter is used than the one used in Example 1. As a result, the syrup introduced to the disk stack centrifuge 14 would have a moisture content estimated at 60% by weight. While this does not impact the product value figures, the syrup from the centrifuge 14 has a moisture content of only 66.6% by weight, as compared to 82.5% by weight in Example 1. As a result, the cost per hour of drying this syrup when combined with the distillers wet grains to achieve an end product having a moisture content of less than 10% is only $158.92, or approximately 40% less. Assuming a savings in dryer efficiency of 10%, the product value per hour ($678.46) less the estimated dryer operating cost ($143.03 per hour) and less the estimated evaporator operating cost ($74.96 per hour) is $460.46 per hour. This represents an approximate 15% increase over the corresponding value calculated for Example 1.

As should be appreciated, the above-described method and subsystem of the preferred embodiment essentially require the addition of a centrifuge downstream of the evaporator in the conventional system for processing thin stillage (which centrifuge may thus be considered a "means for" recovering oil from thin stillage). Accordingly, instructions on how to implement the above-described method (including the optimum process variables) may be provided along with a centrifuge for use in an ethanol plant for forming the novel subsystem 10 disclosed herein. Such instructions result in the most efficient implementation of the method, as compared to the situation where the scientists or engineers at the plant must experiment with the centrifuge to determine the optimum process conditions required to achieve a favorable result.

The foregoing description provides illustration of the inventive concepts. The descriptions are not intended to be exhaustive or to limit the disclosed invention to the precise form disclosed. Modifications or variations are also possible in light of the above teachings. For example, the syrup recovered from the centrifuge may be evaporated and processed again in a further effort to recover oil before drying. Moreover, in addition to a self-cleaning bowl type of disk stack centrifuge, a nozzle bowl disk stack centrifuge would work as a means for recovering oil from the concentrate, as would a horizontal centrifugal decanter (which may be especially beneficial when the moisture content of the concentrate is less than 50% by weight) or other like devices for separating oil from a substance including suspended solids. Moreover, besides corn, the present invention may have utility with any other grain used in a dry milling process for producing ethanol, such as for example, milo. The embodiments described above were chosen to provide the best application to thereby enable one of ordinary skill in the art to utilize the inventions in various embodiments and with various modifications as are suited to the particular use contemplated. All such modifications and variations are within the scope of the invention.

What is claimed is:

1. A method of recovering oil in a dry milling corn-to ethanol plant, the method comprising:
   dry milling corn at the ethanol manufacturing facility by converting starch in the corn to sugar;
   fermenting the sugar to produce ethanol and whole stillage;
   separating the whole stillage in a separator to produce a distillers wet grains and a thin stillage, wherein each of the distillers wet grains and the thin stillage contain corn oil;
   evaporating the thin stillage in an evaporator in the ethanol manufacturing facility to remove water and form a concentrated byproduct, wherein the concentrated byproduct contains corn oil;.
   centrifuging the concentrated byproduct in a centrifuge located downstream from the evaporator in the ethanol manufacturing facility to separate at least a portion of the corn oil from the concentrated byproduct, wherein the concentrated byproduct has a moisture content of greater than 60% and less than 85% by weight; and
   recovering the separated oil from the centrifuge.

2. The method of claim 1, further comprising mixing the concentrated byproduct remaining after centrifuging with distillers wet grains to form a mixture; and drying the mixture in a dryer downstream from the evaporator and centrifuge to make distillers dried grains with solubles.

3. The method of claim 1, wherein evaporating the thin stillage in the evaporator to remove water and form the concentrated byproduct comprises processing the thin stillage to a temperature of between about 150 and about 212° F., and a pH of between about 3 and about 6.

4. The method of claim 1, wherein the centrifuge is a disc stack centrifuge.

5. The method of claim 2, wherein drying the concentrated byproduct in the dryer is to a moisture content of less than 10% by weight.

6. The method of claim 1, wherein evaporating the thin stillage in the evaporator in the ethanol manufacturing facility to form the concentrated byproduct and centrifuging the concentrated byproduct to separate at least the portion of the oil from the concentrated byproduct is continuous.

7. The method of claim 1, wherein the separator is selected from a group consisting of a press, an extruder, a decanter centrifuge, and a screen centrifuge.

* * * * *